United States Patent
Lin et al.

(10) Patent No.: US 9,729,326 B2
(45) Date of Patent: Aug. 8, 2017

(54) DOCUMENT CERTIFICATION AND AUTHENTICATION SYSTEM

(76) Inventors: Feng Lin, Troy, MI (US); Robert D. Brandt, Madison, WI (US); William Stephen Lacy, Madison, WI (US)

(*) Notice: Subject to any disclaimer, the term of this patent is extended or adjusted under 35 U.S.C. 154(b) by 1260 days.

(21) Appl. No.: 12/150,098

(22) Filed: Apr. 25, 2008

(65) Prior Publication Data

US 2010/0067691 A1 Mar. 18, 2010

(51) Int. Cl.
G09C 5/00 (2006.01)
H04L 9/32 (2006.01)
H04N 1/32 (2006.01)

(52) U.S. Cl.
CPC ....... *H04L 9/3247* (2013.01); *H04N 1/32144* (2013.01); *H04L 2209/608* (2013.01); *H04L 2209/805* (2013.01); *H04N 2201/3205* (2013.01); *H04N 2201/3235* (2013.01); *H04N 2201/3236* (2013.01); *H04N 2201/3281* (2013.01)

(58) Field of Classification Search
CPC ............ H04L 9/3247; H04L 2209/608; H04L 2209/805; H04N 2201/3205; H04N 2201/3235; H04N 2201/3281; H04N 2201/3236; H04N 1/32144
USPC ................................ 713/176, 179; 358/3.28
See application file for complete search history.

(56) References Cited

U.S. PATENT DOCUMENTS

| | | | |
|---|---|---|---|
| 5,530,755 A | * | 6/1996 | Pailles et al. ................ 713/179 |
| 6,725,220 B2 | * | 4/2004 | Stratigos et al. |
| 7,394,573 B1 | * | 7/2008 | Goldberg et al. ............ 358/3.28 |
| 7,633,652 B2 | * | 12/2009 | Tamura et al. .............. 358/3.28 |
| 7,715,613 B2 | * | 5/2010 | Dobbs et al. ................. 382/135 |
| 2006/0072144 A1 | * | 4/2006 | Dowling et al. ............. 358/1.15 |
| 2007/0047782 A1 | * | 3/2007 | Hull et al. .................... 382/124 |

(Continued)

OTHER PUBLICATIONS

Lawrence O'Gorman et al. "Secure Identification Documents Via Pattern Recognition and Public-Key Cryptography" IEEE Transactions on Pattern Analysis and Machine Intelligence, vol. 20, No. 10, Oct. 1998 (pp. 1097-1102).*

(Continued)

*Primary Examiner* — Joseph P Hirl
*Assistant Examiner* — Thomas Gyorfi
(74) *Attorney, Agent, or Firm* — Mark Malek; Daniel Pierron; Widerman Malek, PL

(57) ABSTRACT

This invention safeguards the integrity of a machine-printed paper document by entangling a characteristic signature derived from the document's paper grain structure with the identities of the printing device and the person or organization which issued the document. This protection is achieved using a certification phase performed by an augmented document printer and an authentication phase performed by an augmented document scanner. In the certification phase, the grain structure of a specific area of the original paper is imaged and processed to generate a unique signature for the paper. This signature is doubly encrypted using the private keys of the augmented printer and the certifier. These encryption steps entangle the signature of the paper with its source information in a way that thwarts counterfeiting attacks which either copy the document or falsely attribute its source to a specific printer and/or certifier.

27 Claims, 12 Drawing Sheets

(56) References Cited

U.S. PATENT DOCUMENTS

2008/0174811 A1* 7/2008 Tanaka et al. ............... 358/1.15
2008/0240816 A1* 10/2008 Piersol et al. ................ 399/381

OTHER PUBLICATIONS

Schneier, Bruce. "Applied Cryptography, 2nd Edition" ©1996 Bruce Schneier. Published by John Wiley & Sons, Inc. (pp. 4, 5, 17, 31-52, 97-100, 180-187, 466-474, 574-577, 588, 589, and 603-605).*

* cited by examiner

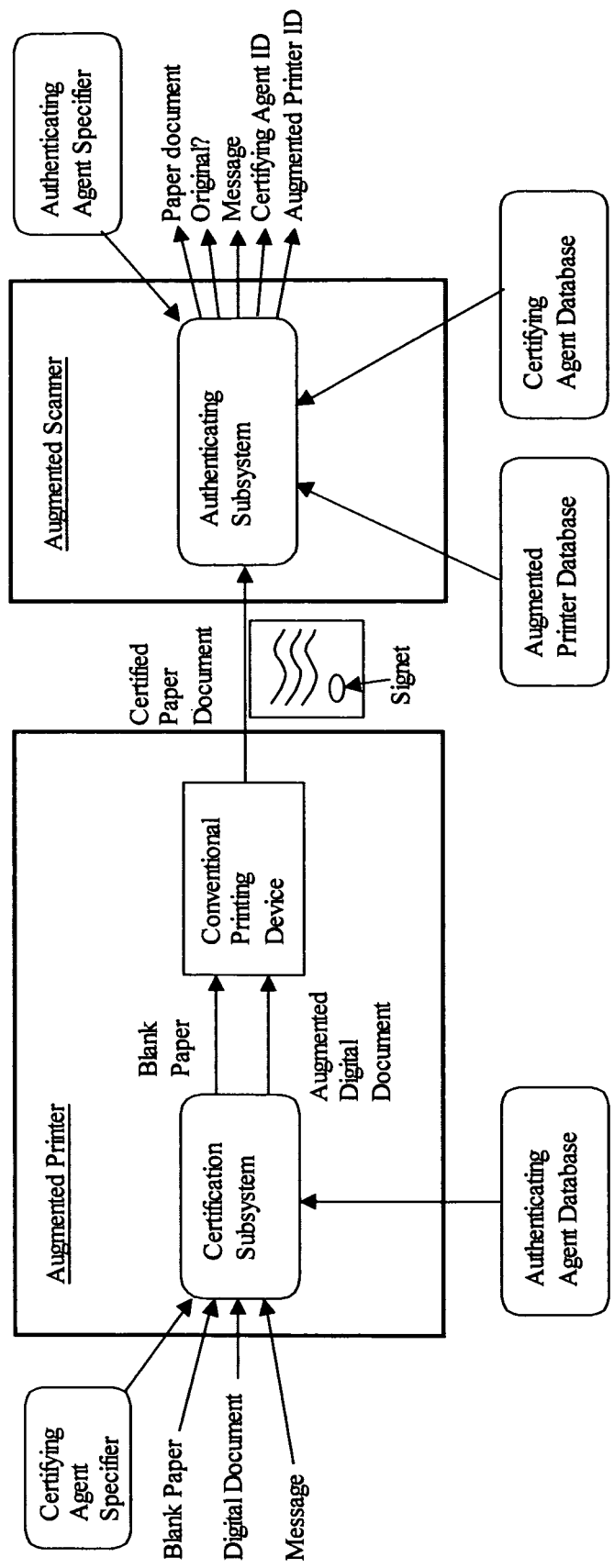
Figure 1: Documentation Certification and Authentication System

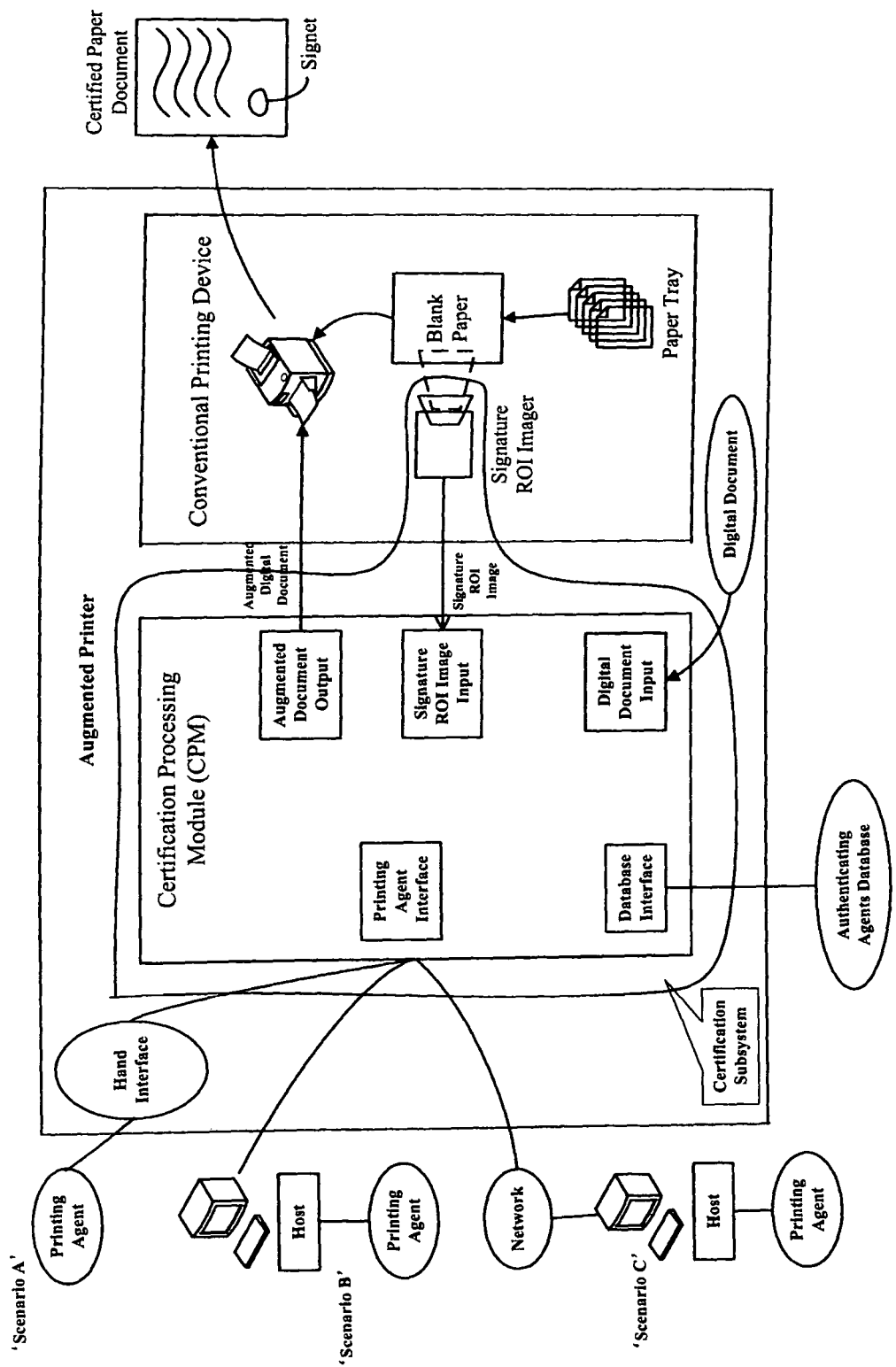
Figure 2: Tightly-Integrated Augmented Printer

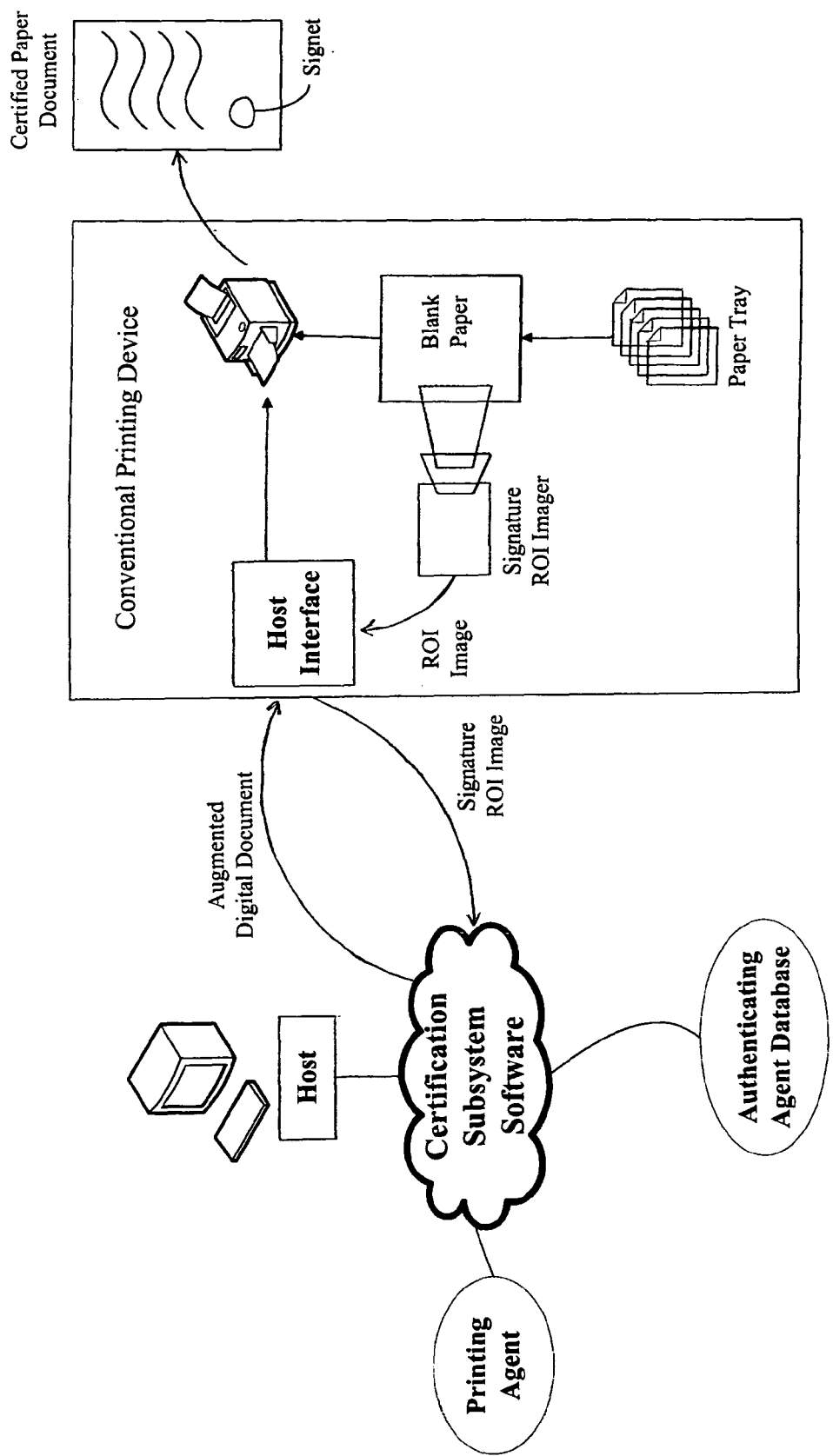
Figure 3: Loosely-Integrated Augmented Printer

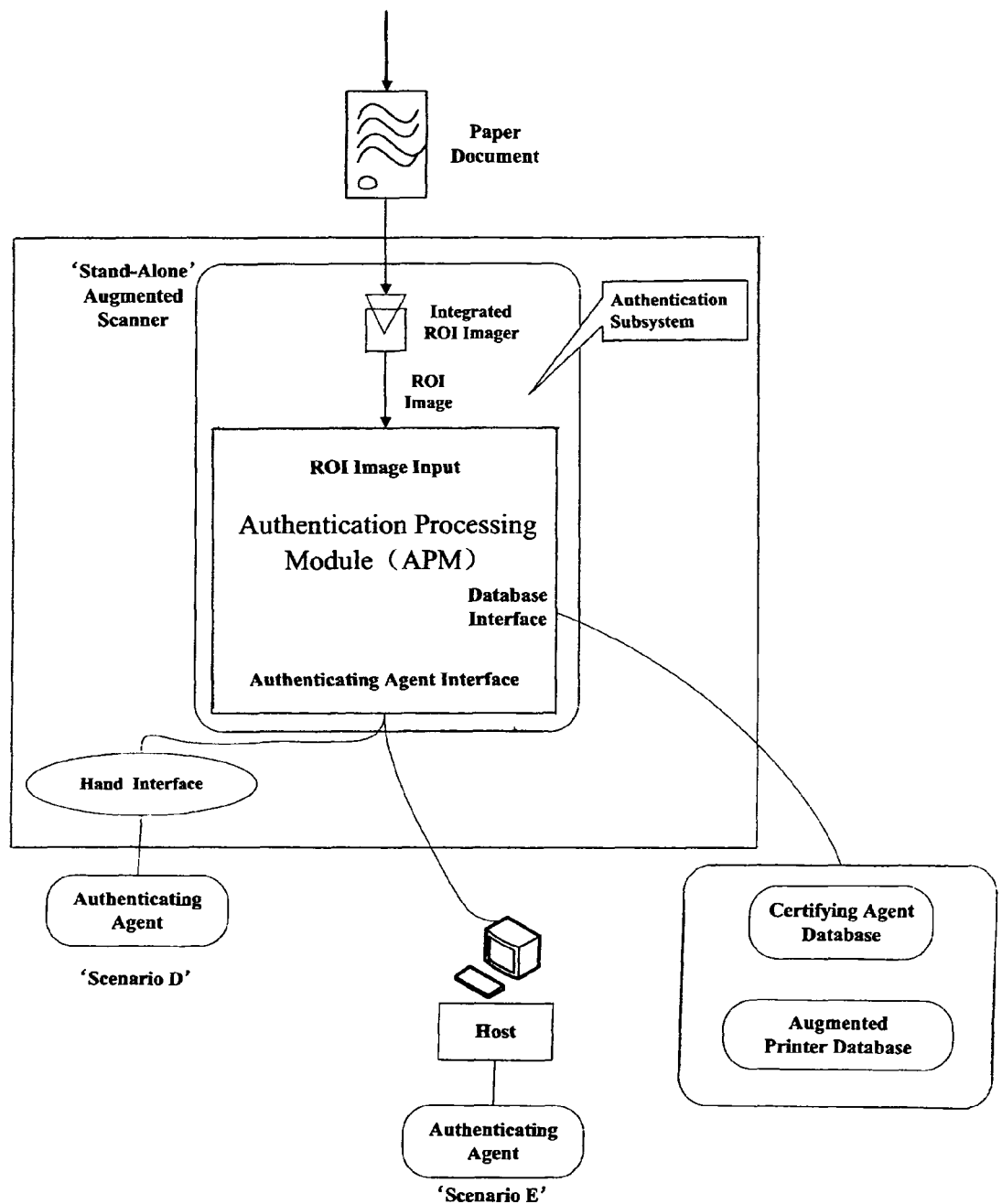
Figure 4: Tightly-Integrated Augmented Scanner

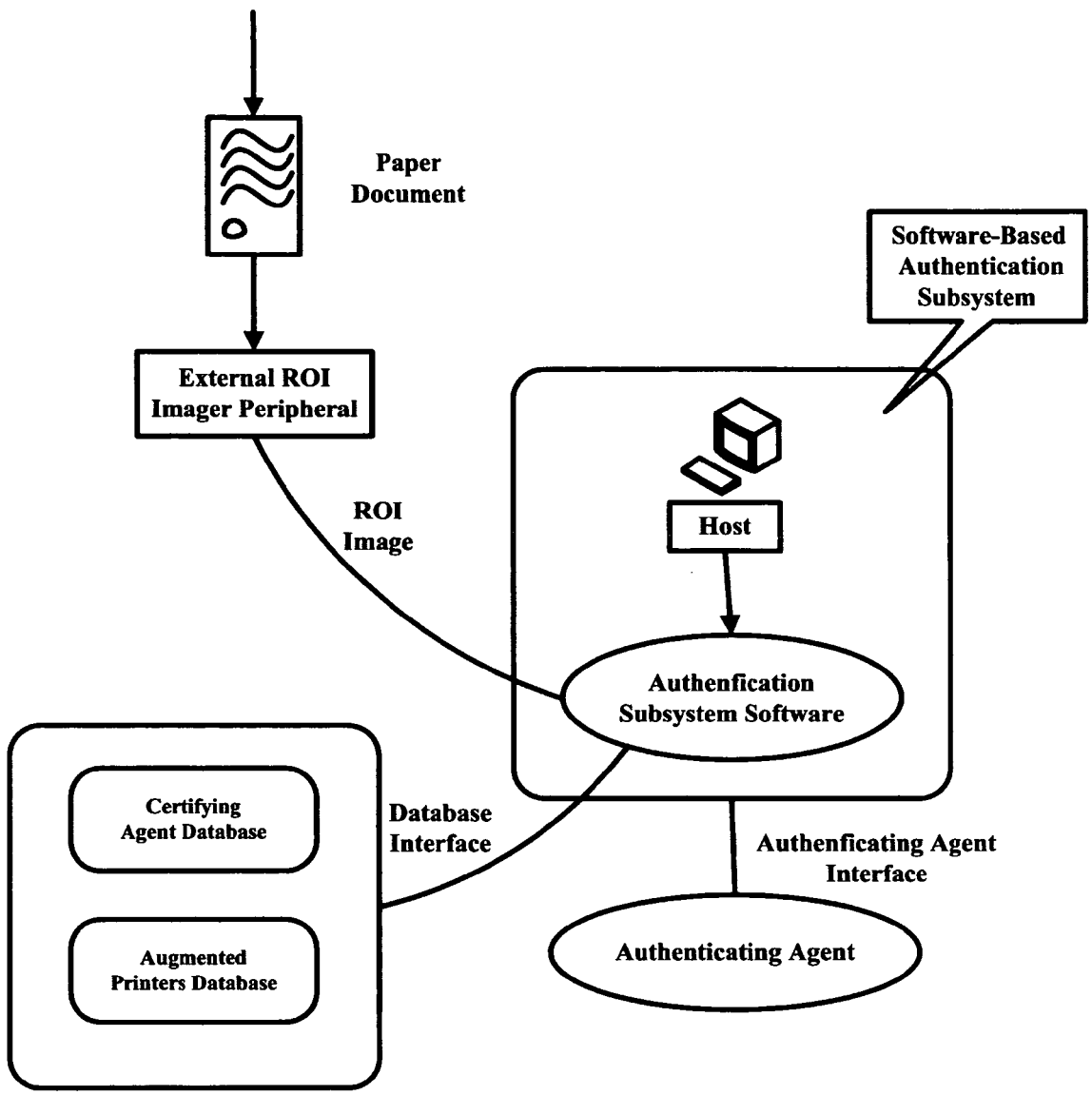
Figure 5: Loosely-Integrated Augmented Scanner

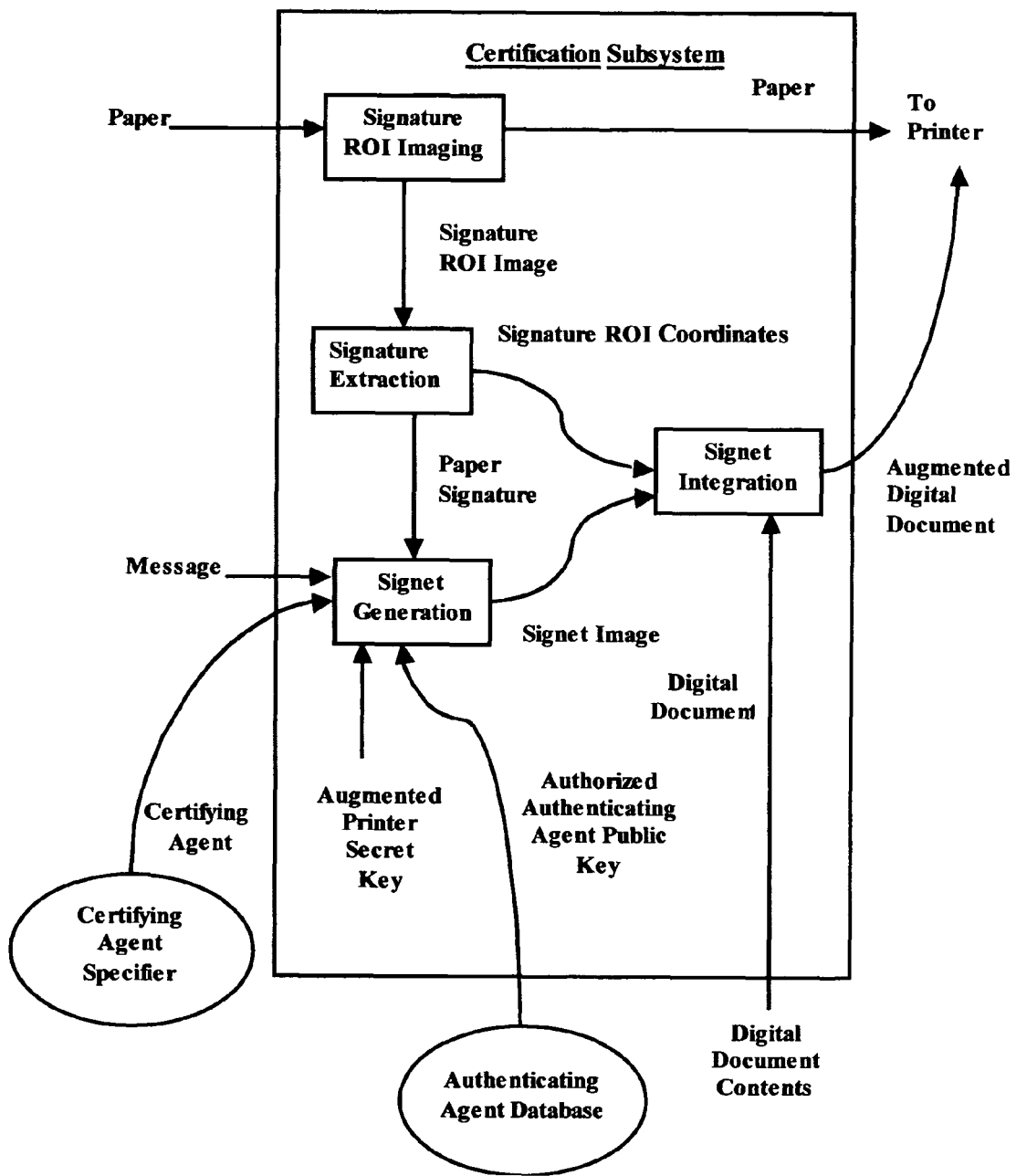
Figure 6: Certification Subsystem Architecture

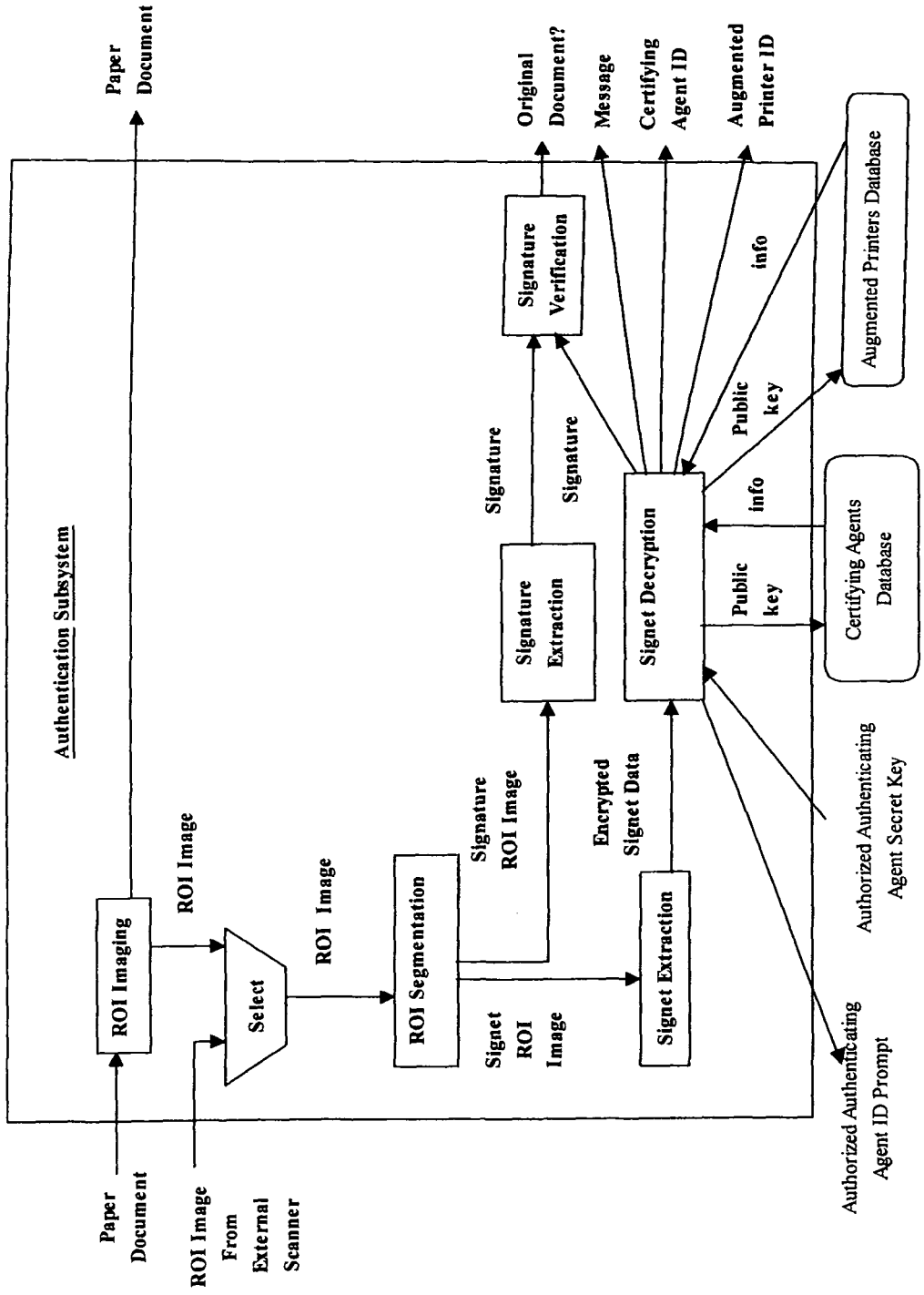
Figure 7: Authentication Subsystem Architecture

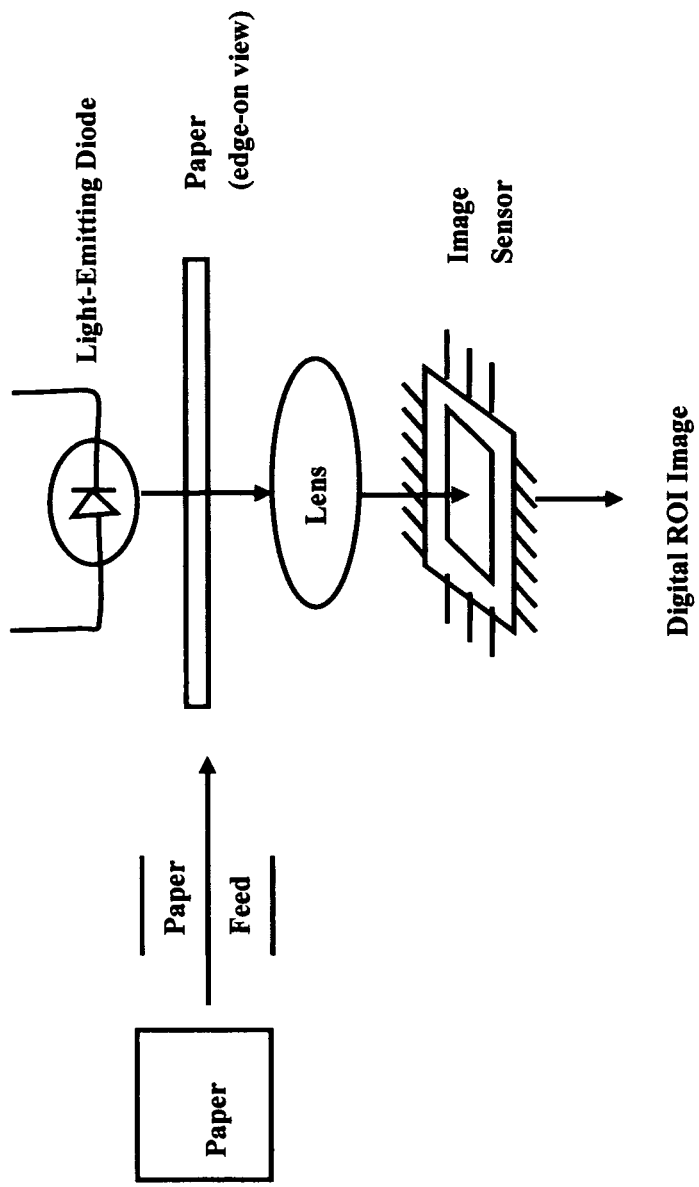
Figure 8: Signature ROI Imaging

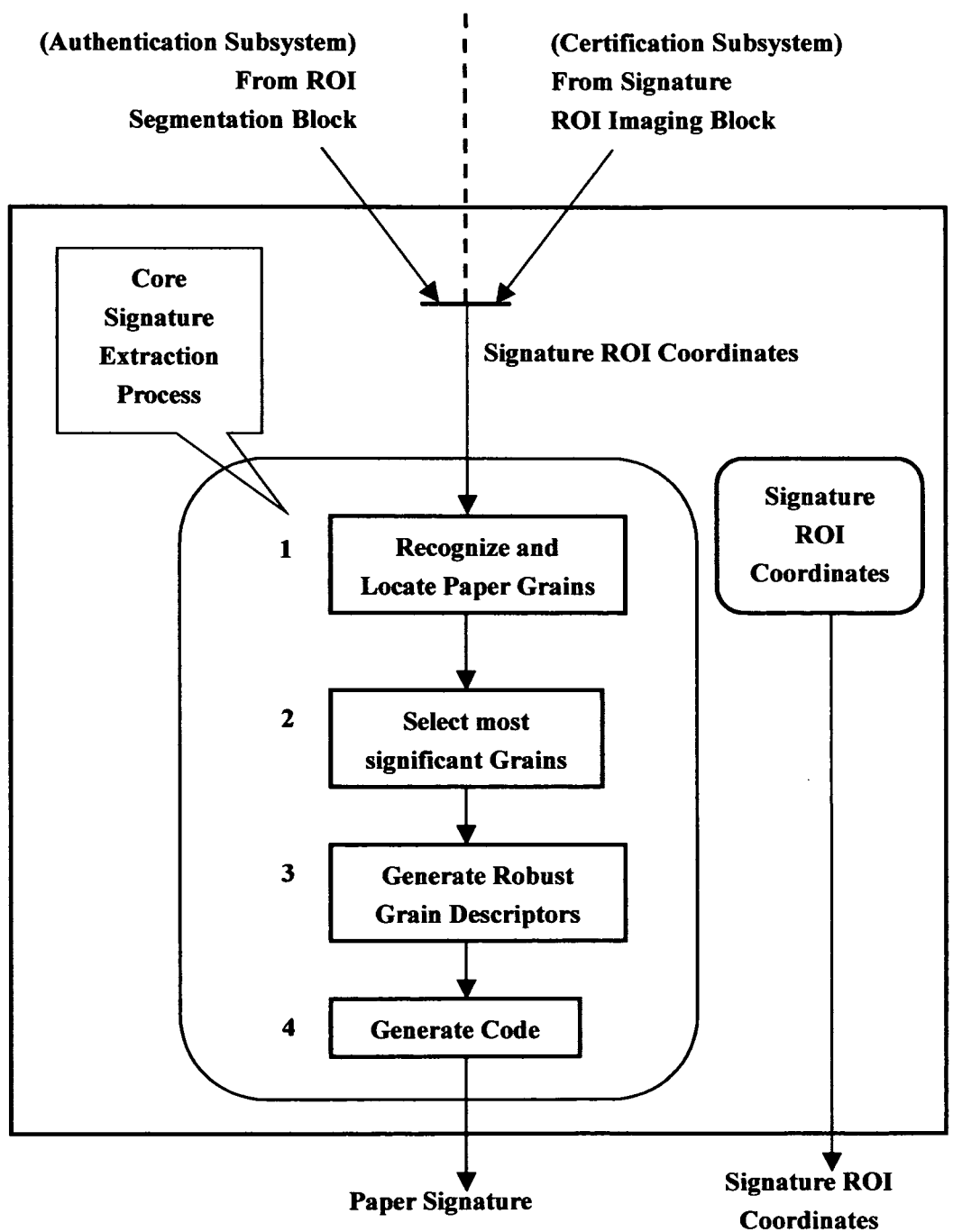
Figure 9: Signature Extraction Top-level Process

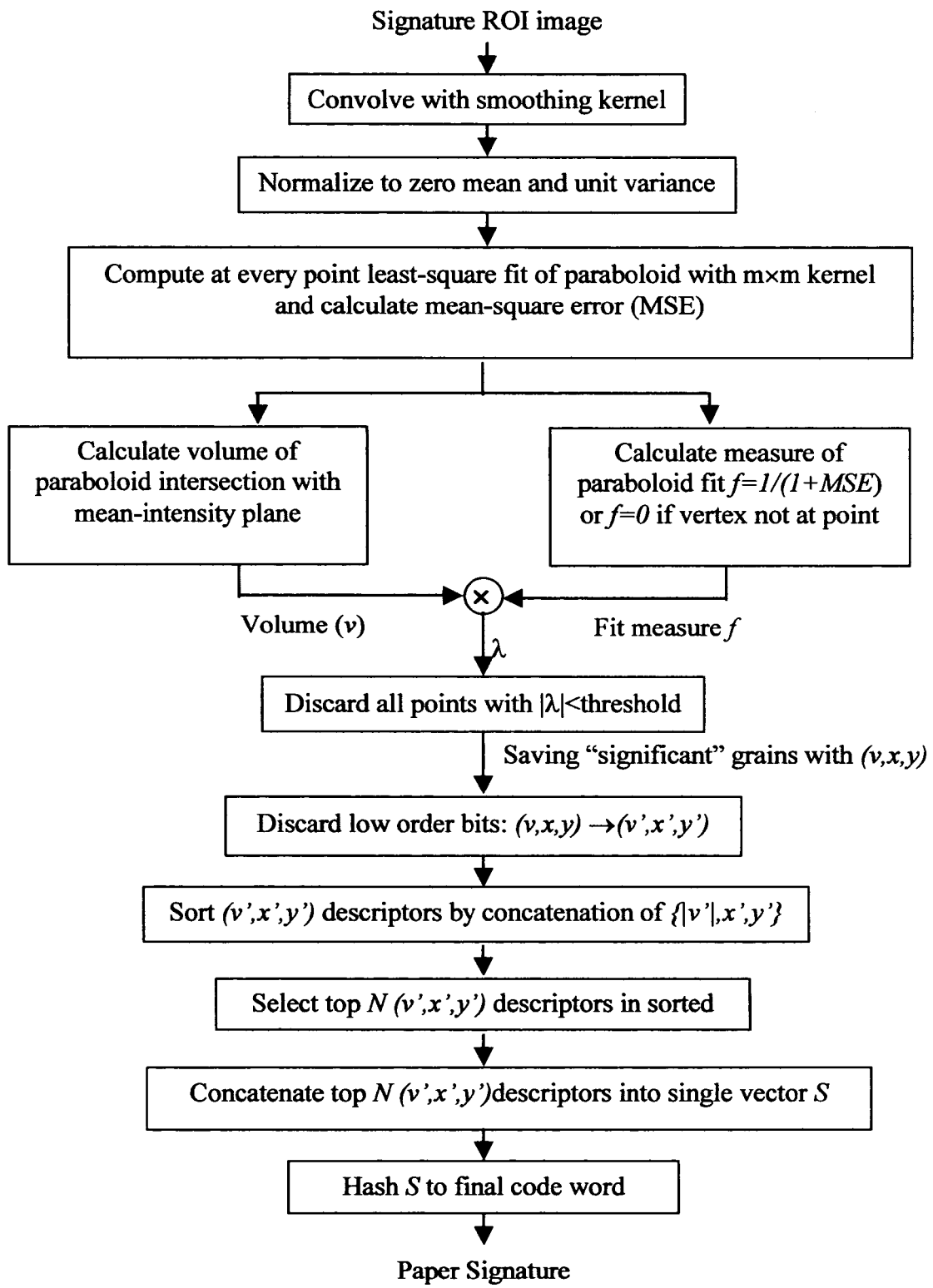
Figure 10: Core Signature Extraction Process

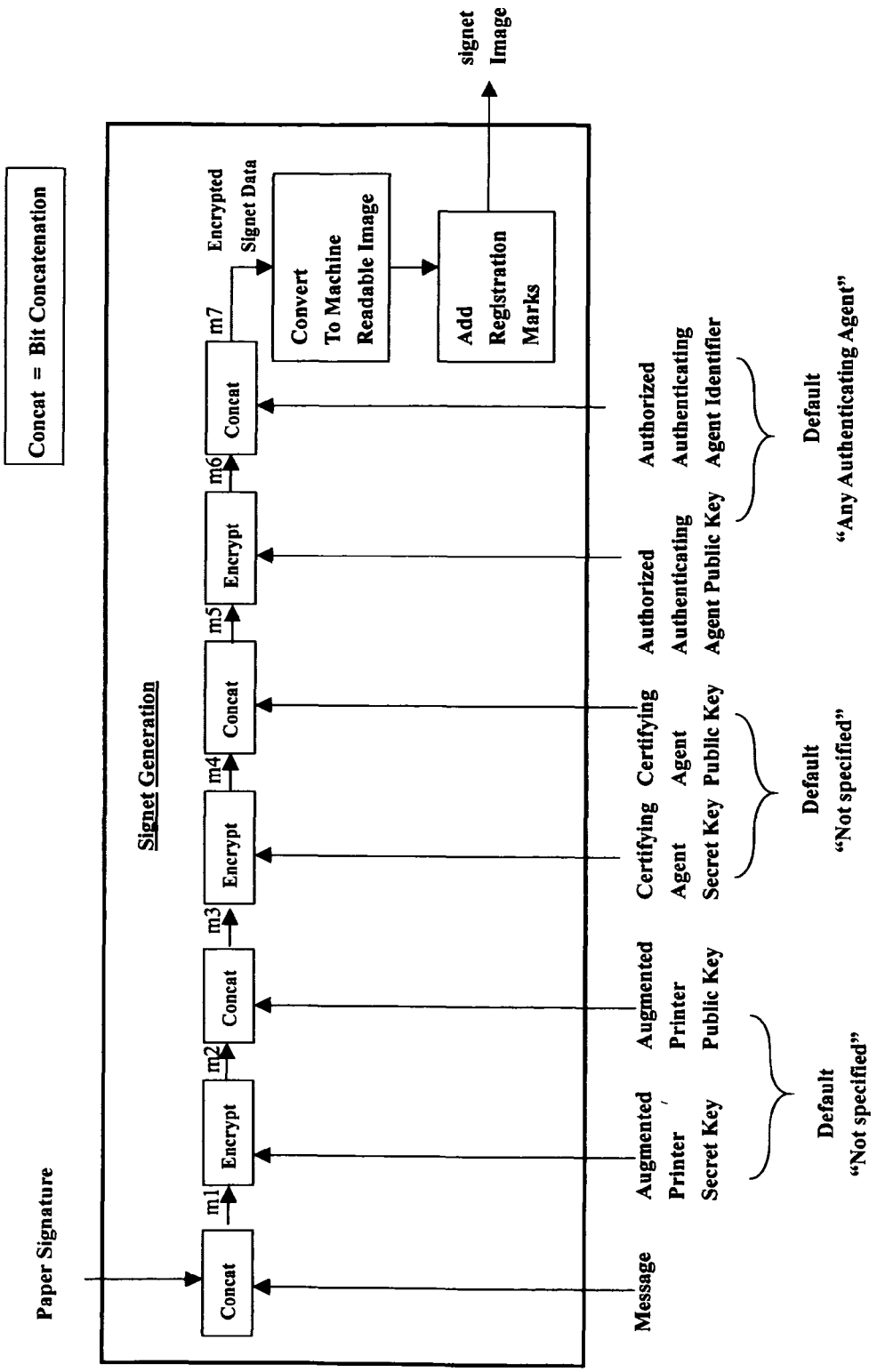
Figure 11: Signet Generation Process

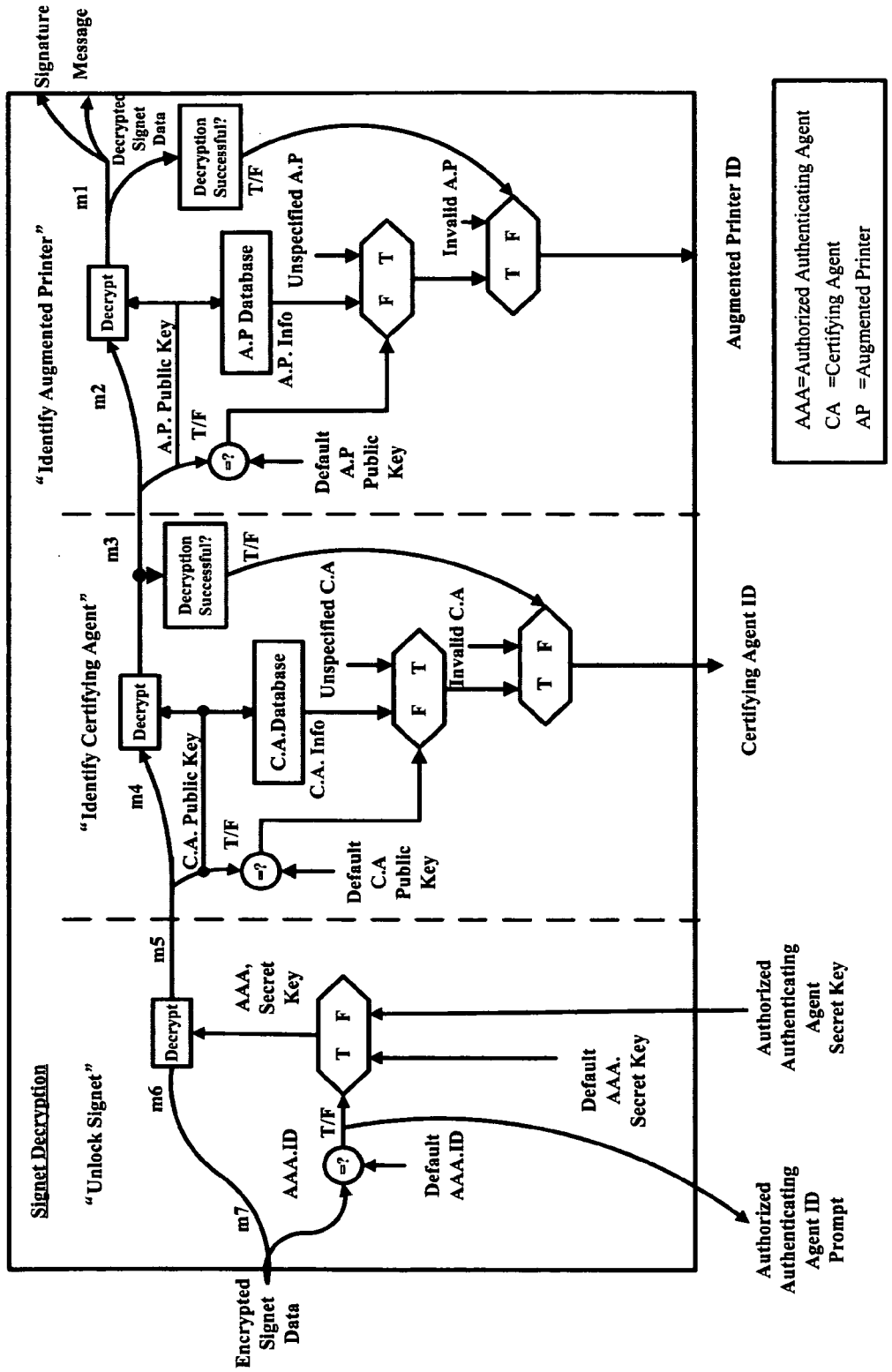
Figure 12: Signet Decryption Process

DOCUMENT CERTIFICATION AND AUTHENTICATION SYSTEM

REFERENCES

U.S. Patent Documents

| | | |
|---|---|---|
| 6,883,706 | Mastie, et al. | Apr. 26, 2005 |
| 6,826,315 | Wickes | Nov. 30, 2004 |
| 6,823,075 | Perry | Nov. 23, 2004 |
| 6,819,775 | Amidror, et al. | Nov. 16, 2004 |
| 6,611,598 | Hayosh | Aug. 26, 2003 |
| 6,381,344 | Smithies, et al. | Apr. 30, 2002 |
| 6,249,588 | Amidror, et al. | Jun. 19, 2001 |
| 5,995,638 | Amidror, et al. | Nov. 30, 1999 |
| 5,912,974 | Holloway, et al. | Jun. 15, 1999 |
| 5,325,167 | Melen | Jun. 28, 1994 |
| 4,853,961 | Pastor | Aug. 1, 1989 |

European Patent Document

| | | |
|---|---|---|
| GB2417707 | Cowburn | Mar. 8, 2006 |

CROSS-REFERENCE TO RELATED APPLICATIONS

None

BACKGROUND OF THE INVENTION

Field of Invention

The present invention relates to document security. In particular, it describes a method for using the characteristic grain structure of a paper and public/private key encryption to protect the integrity of machine-printed paper documents.

Prior Art

Given a printed paper document, it is often desirable or necessary to reliably ascertain one or more of the following facts regarding the document: (1) the physical device which printed the document contents onto the paper, (2) the individual(s) or organization which issued the document, and (3) whether the document is printed on the original paper used by the issuing entity. Since items (1) and (2) describe the document's source, we refer to them collectively as the document's "Source ID." Ascertaining item (3) implies that a unique, identifying signature can be derived for the paper on which the document is originally printed. We refer to this identifying signature hereafter as the "paper signature." We define "document certification" as the process of associating a Source ID and a paper signature with a printed paper document. We define "document authentication" as the process of extracting the Source ID and paper signature from a paper document, and verifying their validity. We define "document security" as the combined problems of document certification and document authentication.

The principle challenge for document security system is to prevent or detect counterfeiting attacks. We define a "counterfeiting attack" as any process having the following goal: to falsely attribute a specific paper document to a specific document source (i.e., person, organization, or printing device). Note that a paper document consists of two items: a specific piece of paper and specific information which is printed on that piece of paper. Therefore, a paper document is counterfeit if either the printed information or the paper on which the information is printed (or both) did not originate from the claimed document source. The document's Source ID and paper signature must be associated with the document in a way which protects the integrity of both pieces of information from counterfeiting attacks.

Before discussing prior art in the area of document security, it is instructive to classify the possible modes of counterfeiting attack in order to evaluate how well prior approaches protect against them. It is useful to classify counterfeiting attacks into two broad types: Copy Attack and Spoofing Attack. We define these terms as follows:

1. Copy Attack: In this form of attack, a counterfeiter obtains a document containing valid Source ID information and attempts to transfer the Source ID from the original paper to a new piece of paper. The new paper document may contain arbitrary printed content. It can be an exact reproduction of the original document, a modified reproduction, or a document with completely different content. The important point is that rather than attempting to directly generate a Source ID encoding for the counterfeit document, the counterfeiter transfers a valid Source ID encoding from an existing document. This form of counterfeiting attack therefore does not rely on an understanding of how the Source ID is encoded (the Source ID could even be encrypted and therefore unreadable to the counterfeiter)—it only requires a means of accurately reproducing the Source ID encoding in the counterfeit document.

2. Spoofing Attack: In this form of attack, the counterfeiter attempts to directly construct (rather than transfer) a Source ID encoding which falsely attributes a document to a third party (that is, without the third party's permission or cooperation). The counterfeiter might do this by using a legitimate apparatus for generating and printing the Source ID encoding, but with modifications which permit the counterfeiter to attribute the document to a third party.

The remainder of this section summarizes prior art in document security and evaluates the effectiveness of prior approaches in detecting various forms of Copy and Spoofing Attacks.

Digital Watermarking Approaches

A large body of prior art in document authentication focuses on "digital watermarking" of printed documents. A recent and representative example is U.S. Pat. No. 6,823,075 (Perry). This patent contains an extensive summary of prior art in digital watermarking.

A digital watermark is a signal which is added to the printed contents of the paper document. The watermark signal contains information testifying to the source and authenticity of the document. Document authentication consists of reading the watermark signal from a paper document and checking its content. If the watermark is not found or is not in the proper format, the document is rejected as counterfeit. The watermark therefore functions as the paper signature and as a carrier of the document's Source ID.

Digital watermarking attempts to prevent certain forms of counterfeiting by making it difficult to reproduce a valid watermark in counterfeit documents. Reproducing the watermark could involve explicitly reading the watermark from a document and then reprinting it in a counterfeit document. The watermark signal could be reproduced in a pixel-per-pixel fashion or it could be modified if the counterfeiter was capable of decoding the signal and generating a new signal. Digital watermarking techniques try to prevent this form of attack by making the watermark signal difficult to detect (e.g., using spread-spectrum techniques to distribute the signal energy in the frequency domain in some psuedo-random but reproducible fashion).

Assuming this deters a counterfeiter from explicitly reading the watermark signal, a counterfeiter could still try to reproduce the document while preserving the watermark. This would involve scanning the document using sufficient optical resolution to capture most of the energy in the watermark signal and then reprinting the scanned image at high resolution. Digital watermarking techniques try to prevent this form of attack by making the watermark signal "fragile" so that copy attempts degrade the watermark signal energy in some way that is detectable to an authentication device.

Clearly, digital watermarking is focused on deterring Copy. Attacks. The assumption is that the Source ID information contained in a correctly-formatted watermark is always valid and that the only security problem is to prevent the watermark from being illegally transferred from a valid original document to a counterfeit document. As noted above, this is not the only form of counterfeiting attack. Specifically, digital watermarking techniques do not address the threat of Spoofing Attacks in which a watermark is correctly generated and rendered but contains counterfeit Source ID information, falsely attributing the document to a third party source. A Spoofing Attack could be carried out using a valid watermarking apparatus to generate a watermark which contains information attributing the document to a third party without that party's permission or participation. The watermark signal itself does nothing to prevent this scenario since it is only the carrier of the falsified Source ID information. Additional system functionality beyond the watermarking technique is clearly required to prevent false Source ID information from being inserted into the watermark.

The ability of digital watermarking to deter Copy Attacks is also limited because it depends critically on preventing the watermark signal from being illegally transferred to another piece of paper. Preventing this form of transfer is necessary because the watermarking signal is not intrinsic to the paper on which it is printed—i.e., the same signal could be legitimately applied to any sheet of paper. If the signal encoded intrinsic properties of the paper instead, it would not be necessary to keep the watermarking signal hidden or fragile. The use of a non-intrinsic signal for the paper signature therefore introduces a potential security hole. The existence of a legitimate apparatus to read the watermark signal implies there is some finite optical resolution at which sufficient energy of the watermark signal can be captured by an imaging device. If the captured image can be printed at adequate resolution to preserve the watermark signal energy, then the watermark signal can indeed be transferred from one piece of paper to another, resulting in a successful Copy Attack.

Moiré Effect Approaches

Another set of document authentication techniques in the prior art focuses on using moiré effects to give a paper document a unique signature. A recent and representative example is U.S. Pat. No. 6,819,775 (Amidror, Hersch). This patent provides a detailed summary of prior art in moiré-effect-based approaches. Other related patents and published patent applications by Amidror and Hersch are: U.S. Pat. Nos. 6,249,588, 5,995,638, U.S. Pat. Application No. 20040001604, and U.S. Pat. Application No. 20020012447.

A moiré pattern is an interference pattern created when two grids are overlaid at an angle, or when they have slightly different mesh sizes. The use of moiré patterns for document authentication is similar to the use of digital watermarking. As in digital watermarking, a signal is added to the document contents which will produce a moiré pattern when superimposed in some manner with another signal. Authenticating a document consists of viewing it through an appropriate apparatus which will superimpose the two patterns and create a visible, specific moiré pattern if the document is valid. Absence of the moiré pattern or the presence of an unexpected moiré pattern indicates a counterfeit document. As indicated in U.S. Pat. No. 6,819,775 (Amidror, Hersch), the moiré pattern can contain document Source ID information. The embedded signal to produce the moiré pattern therefore functions as both the paper signature and a carrier for Source ID information. This is analogous to the role of the watermarking signal in digital watermarking approaches.

As with digital watermarking, a key goal in moiré pattern approaches is preventing the signal from being easily reproducible or transferable by a counterfeiter. Specifically, U.S. Pat. No. 6,819,775 (Amidror, Hersch) makes the following claim:

The fact that moiré effects generated between superposed dot-screens are very sensitive to any microscopic variations in the screened layers makes any document protected according to the present invention practically impossible to counterfeit, and serves as a means to distinguish easily between a real document and a counterfeited one.

Assuming this particular claim is true, moiré-effect-based approaches have the same fundamental limitation as digital watermarking approaches: they are designed to prevent Copy Attacks and do nothing to address Spoofing Attacks. The signal used to generate the moiré pattern is only a carrier of the Source ID information and cannot be used to detect whether that information is valid or falsified to begin with. There is nothing in the moiré technique itself which prevents false Source ID information from being added to a document using a valid moiré-capable printing apparatus.

As with digital watermarking, the moiré techniques form a paper signature by embedding a non-intrinsic signal in the paper document. They are therefore subject to the same limitations on Copy Attacks noted above for digital watermarking techniques. While both techniques make Copy Attacks difficult for technically unsophisticated counterfeiters using conventional reproduction devices, a Copy Attack could theoretically succeed if greater expertise and more sophisticated imaging and reproduction equipment are brought to bear to transfer the non-intrinsic signal from one piece of paper to another.

Digital Signature Approaches

A number of techniques in the prior art attempt to adapt well-known public-key encryption algorithms (such as the RSA algorithm) for document authentication. These approaches all exploit the fact that a sequence of digital bits can be "digitally signed" by encrypting it with the private key of an issuing party to produce a "digital signature." The digital signature resulting from the encryption is appended to the original "clear-text" message to form a composite message. Authentication is accomplished by decrypting the digital signature with the public key of the party to whom the message is attributed. This public key can be included by the sender in the clear-text portion of the composite message. The decrypted message is then compared to the clear text message. If the two messages are identical, two conclusions can be drawn: (1) the party who digitally signed the message is indeed the individual to whom the public key belongs, and (2) neither the clear-text message nor the digital signature were modified after they were generated by the party who digitally signed the message. Practical digital signing algorithms commonly use a variation of the above technique in which the message to be digitally signed is first compressed using a hash function, but this is only done to improve algorithmic runtime and has no bearing on the analysis presented here.

A number of approaches in the prior art apply this digital signing technique to document security. Representative examples include: U.S. Pat. No. 5,912,974 (Holloway, Matyas), U.S. Pat. No. 5,157,726 (Merkle, Bloomberg, Brown), and U.S. Pat. No. 4,853,961 (Pastor). Despite some variations in method and intended application, these approaches use the same fundamental technique: they convert the printed contents of a paper document to some digital representation and then apply the digital signing technique to the digital representation of the printed document. The resulting digital signature is added to the paper document in some encoded, machine-readable form such as a barcode. Document authentication is accomplished by: (1) converting the printed document contents into the same digital representation originally used to generate the digital signature, (2) decrypting the digital signature included with the document using the public key of the alleged document source, and (3) comparing the decrypted digital signature with the digital representation of the document contents.

This technique indeed prevents certain forms of counterfeiting attack. For example, the printed content of a paper document cannot be falsely attributed by a counterfeiter to a third party (a Spoofing Attack) because the third party is identified by a public key and the document content must be digitally signed using the corresponding private key of the third party. As long as the counterfeiter cannot obtain the third party's private key, Spoofing Attacks of this sort are prevented. Additionally, a valid third-party digital signature cannot be transferred without detection from the document it was generated for to another paper document which has different printed content. This is because the third-party digital signature is formed using the original document content and will be inconsistent if transferred to a document with different content. This prevents a Copy Attack in which some of the printed document content is modified.

However, these approaches fail to protect against a Copy Attack which does not modify the printed document contents. In other words, if a counterfeiter transfers the exact printed contents of the document to another piece of paper (including the printed digital signature), the new paper document cannot be distinguished as a copy of the original. The reason is that only the printed information on the paper was digitally signed by the sender of the document. The digital signature contains no information that uniquely identifies the paper the original document was printed on. In other words, these approaches do not utilize a paper signature which can be used to distinguish different pieces of paper. Therefore, copies of identical documents on different paper cannot be distinguished. Copy Attacks which do not modify the document contents cannot be detected.

U.S. Pat. No. 6,611,598 (Hayosh) describes a modification to digital signing approaches that attempts to strengthen protection against Copy Attacks with no modification. When a document is created, this system generates a digital identifying tag (not the digital signature) for the paper and prints it on the paper using a special magnetic ink. This gives the paper a magnetic signature that can be detected during the authentication process. The magnetic signature printed on the paper is then encoded in some digital format and is concatenated with arbitrary user-defined data. The result of the concatenation is digitally signed with the private key of the issuing party. The digital signature is then printed on the document as a barcode. Authentication consists of using the public key of the issuing agent to decrypt the digital signature, retrieving the magnetic signature code from the decrypted data, re-reading the magnetic signature from the paper, and comparing the two signatures.

The approach is secure only if the magnetic signature applied to the paper cannot be transferred to another paper by a counterfeiter. If the magnetic signature can be transferred, the scheme is vulnerable to a Copy Attack with no modification—i.e., the magnetic signature provides no benefit. Like digital watermarks and moiré patterns, the magnetic signature is not derived from any intrinsic property of the paper. Therefore, it is vulnerable to being read and transferred from one paper to another by a counterfeiter. The existence of a legitimate apparatus for writing and reading a magnetic signature implies that a counterfeit apparatus for this purpose can also be produced with sufficient effort and ingenuity (perhaps by modifying the legitimate apparatus).

Paper-Grain/Light Scatter/Surface-Texture Based Approaches

The prior approaches described so far all suffer from a common limitation: the identifying signal applied to the document in question does not incorporate information intrinsic to the paper on which the document was printed. These systems are therefore vulnerable to various forms of Copy Attack in which the non-intrinsic nature of the signal allows it to be transferred from one paper to another, provided the signal can be reliably reproduced by a technically-sophisticated counterfeiter.

The final category of prior art we discuss avoids this limitation by deriving a paper signature directly from intrinsic properties of the paper itself. Specifically, these approaches use optical imaging of paper grains or surface texture to derive a unique signature for the paper a document is printed on.

U.S. Pat. No. 5,325,167 (Melen) describes a system which generates an identifying signature for a piece of paper using optical imaging of paper grain structure within a region of interest. Elementary image processing operations are performed on the paper grain image to remove high-frequency noise and DC offset. The resulting filtered pixel values collectively form a digital code for identifying the paper.

More recently, Cowburn has filed a patent with European Patent Office (GB2417707). In Cowburn's system, the surface of certain materials (such as paper and plastic) is illuminated with a laser and multiple detectors record an optical-scattering pattern which generates an image of surface texture. As with Melen's system, elementary image processing operations are performed on the recorded pixel values to filter high-frequency noise and remove the DC component and the filtered pixel values are collectively used to form an identifying digital code for the object.

Cowburn and Melen both propose using this signature to authenticate the source of various types of items, including paper documents. We focus here on the application to paper documents. In the approaches of both Cowburn and Melen, a reference signature is generated for a predetermined region-of-interest within the paper on which a document is printed. This reference signature can be printed on the document itself within a barcode-type region or it can be stored in a database at the site issuing the document. "Authentication" of a paper document is accomplished by re-deriving the paper signature from the predetermined region of interest and comparing this signature to the reference signature using cross-correlation of the two signatures.

If the cross-correlation exceeds a threshold, the document is judged as authentic; otherwise, it is judge as counterfeit. If the reference signature resides in a database, then the re-derived paper signature must be cross-correlated against all entries in the database. If no match results, the paper document is classified as not having been issued by the site containing the database. We focus here on the case where the reference signature is included in the document itself.

In the system described by Melen, the reference signature is stored in unencrypted form in a barcode-type region of the document. Melen mentions that arbitrary user-defined data can also be co-located (in non-encrypted form) with the reference signature. This user-defined data could indicate the document source. Because the Source ID information is printed on the document in clear-text format and is not used to encrypt the reference signature, Melen's system provides little protection against counterfeiting attacks. A counterfeiter can selectively modify both the Source ID information and the reference signature when generating a new counterfeit document. For example, using Melen's proposed apparatus, a counterfeiter could generate a valid reference signature for a copy of the original document and then attribute the document to either the original third-party source or any other source.

In the system proposed by Cowburn, a coherent light source (laser) is used to shine light on a paper and several detectors are used to detect the light scattered from different parts of the paper. A digital signature is then generated from the pattern of scatter. Because the light scatter pattern is rather cumbersome to obtain and not robust at all, the system proposed by Cowburn is very complex and much less reliable.

Objects and Advantages

A Copy Attack on our system would involve transferring a valid signet from one piece of paper to another. This can be detected because the paper grain signature originally encoded in the signet will not match the grain signature of the new paper the signet is transferred to. A Copy Attack could only succeed if the transferred signet could somehow be modified to contain the signature of the new paper to which the signet is transferred. However, to construct a valid signet, the new paper signature must be encoded with the private key of the original Certifier, Augmented Printer, or both. It is assumed that the counterfeiter does not have access to the private keys of these entities. Therefore, the counterfeiter cannot selectively change the paper signature in the signet while simultaneously retaining the original Source ID. Therefore, a Source ID cannot be transferred to a new piece of paper.

A Spoofing Attack on our system requires a counterfeiter to construct a signet which references a third-party Certifier and/or Augmented Printer. A counterfeiter could certainly generate a signet and then modify its Certifier public key and/or Augmented printer public key to reference third-party sources. However, the counterfeiter would also need the private keys of the targeted third-party sources in order to encrypt the signet data (paper signature and user message). As long as these private keys are kept secure, they cannot be used by a counterfeiter. Any Spoofing Attack which false attributes the document to a third-party Certifier and/or Augmented Printer is therefore detectable by an Authentication Subsystem.

Comparison with Digital Watermarking/Moiré Effect Approaches

In contrast to Digital Watermarking/Moiré Effect Approaches, our system uses an intrinsic physical property of the paper to derive an identifying signature: the paper grain structure. This grain structure cannot be feasibly duplicated in another piece of paper. Therefore, there is no need to hide the data which encodes it. The signet in our system does not have to be hidden or degraded when copied. Its security rests in the fact that the paper grain signature of the paper has been entangled with the identities of the Certifier and Augmented Printer using public-key encryption. As demonstrated earlier, this prevents all forms of Copy and Spoofing Attack.

Comparison with Digital Signature Approaches

We should note here that the encryption our system performs using the Certifying Agent and Augmented Printer private keys is fundamentally the same form of encryption algorithm described above for generating the digital signature. The difference is that our system does not include any "clear-text" message—only the result of the encryption. We chose not to use the terms "digital signing" and "digital signature" in our system description in order to avoid confusion with our use of the term "signature" in describing the encoded paper grain structure within a region of interest. We use the terms "digital signing" and "digital signature" in the present discussion since they are standard terminology for this application of public-key encryption and are widely used in descriptions of prior art.

Our system exploits the digital signing algorithm described above, but it applies the algorithm to the grain signature of the original paper the document is printed on rather than the document contents. This allows our system to detect a Copy Attack which does not modify the printed document contents. Note that our system also detects Copy Attacks which do modify the document contents. This is because a Copy Attack always involves transferring some subset of the original document contents to a new piece of paper and our system detects when the paper is inconsistent with the signet printed on it.

Comparison with Paper-Grain/Light Scatter/Surface-Texture Based Approaches

Our system has advantages of both Melen's system and Cowburn's system, and more. For example, one difference between our system and the systems of Melen and Cowburn concerns how the paper signature is represented. Melen and Cowburn both use approaches that represent the paper signature as a group of filtered pixel intensity values and which use cross-correlation of these values when comparing two signatures. Cross-correlation is a general-purpose technique for template matching which does not attempt to exploit any structural information inherent in the signals it is processing. Paper grains, however, have a definite structure when imaged; algorithms which attempt to exploit this structure will perform better at discriminating/capturing the salient features of paper grains than cross-correlation approaches. Our system attempts to recognize pixel regions that strongly resemble a definite structural form typical of paper grains. This approach further distinguishes our system from the prior art discussed above.

BRIEF DESCRIPTION OF THE DRAWINGS

FIG. 1 is a block diagram of Documentation Certification and Authentication System FIG. 2 is a block diagram of Tightly-Integrated Augmented Printer FIG. 3 is a block diagram of Loosely-Integrated Augmented Printer FIG. 4 is a block diagram of Tightly-Integrated Augmented Scanner FIG. 5 is a block diagram of Loosely-Integrated Augmented Scanner FIG. 6 is an Architecture of Certification Subsystem FIG. 7 is an Architecture of Authentication Subsystem FIG. 8 is a diagram describing Signature ROI Imaging FIG. 9 is a flow chart of Signature Extraction Top-level Process FIG. 10 is a flow chart of Core Signature Extraction Process FIG. 11 is a flow chart of Signet Generation Process FIG. 12 is a flow chart of Signet Decryption Process

DETAILED DESCRIPTION OF THE INVENTION

A Certified Document is a paper document which contains assertions about its source and originality, and a reliable method for testing the truth of these assertions. Document Certification is the process of generating a paper document containing testable source and originality assertions. Document Authentication is the process of testing the truth of the assertions in a certified document.

A certified document is associated with an entity referred to hereafter as the Certifier. The Certifier is any entity which has authority to represent itself as the source of the document and is identified by a unique code. This code is held by one or more trusted individuals who constitute the set of persons having authority to certify the document's source. The Certifier's unique code can therefore represent an individual, group of individuals, or an entire organization. Note that the Certifier is not necessarily the author of the document content.

The entity which is authorized to authenticate the certified document is referred to hereafter as the Authenticator. Like the Certifier, the Authenticator is identified by a unique code. This code can be held by one or more individuals who are authorized to function as the Authenticator identified by the code.

The individual who operates the augmented printing device used to generate a certified document is referred to hereafter as the printer operator or printer user. The individual who operates the augmented scanning device used to authenticate a certified document is referred to hereafter as the scanner operator or scanner user.

An overview of the complete system for Document Certification and Authentication is first given, and then detailed descriptions of all subsystems will follow.

System Operation

FIG. 1 provides a high-level depiction of the complete system for Document Certification and Authentication. A printer operator generates a certified paper document on behalf of a Certifier using an Augmented Printer. An Augmented Printer combines a Certification Subsystem with a conventional printing device. Example printing devices include fax machines, copy machines, and digital document printers. The Certification Subsystem adds machine-readable, encrypted certification information to the printed document. This certification information allows the document's Certifier, Augmented Printer, and originality to be authenticated.

Document authentication is performed on behalf of an Authenticator by a scanner operator using an Augmented Scanner. An Augmented Scanner implements an Authentication Subsystem which extracts the certification information from the document and analyzes it for internal consistency. If the information is internally consistent, the Authentication Subsystem outputs the confirmed identities of the document's Certifier and/or Augmented Printer. The Authentication Subsystem can detect if the identity of a Certifier or Augmented Printer was illegally associated with the document (analogous to a "forged" signature). The Authentication Subsystem also can detect whether or not the document is an original (i.e., has not been copied since it was generated by an Augmented Printer).

Review of Public-Key Cryptography

A public-key cryptosystem can be used to securely communicate encrypted messages between two parties and/or to authenticate the sender of a message. In such a system, the communicating parties each have a public key and a secret key. The term "private key" is often used synonymously with "secret key." A user can freely publish his/her public key (perhaps registering it in a public database) but should keep the secret key secret. The public and secret keys of a user correspond to encryption/decryption functions which are mathematical inverses of one another. Applying the public key function to a message and then applying the secret key function to the result gives the original message. The same result is obtained by changing the order in which the functions are applied. Either key can be used to encrypt a message and the other key in the pair can be used to decrypt the message. The public and secret key functions are designed so that the secret key cannot be inferred from the public key (or its application to a message) with any feasible amount of computational effort.

Transmission of encrypted messages between two users (Bob and Alice) is accomplished as follows. Suppose Bob wants to send an encrypted message to Alice which only Alice can decrypt. Bob has access to Alice's public key and uses it to encrypt the message. He then sends the encrypted message to Alice. Alice notices the message is encrypted and addressed to her, so she applies her secret key to it. Because Alice's public and secret keys are inverse functions, Alice is able to decrypt the message. However, because the message was encrypted with Alice's public key and only Alice has access to Alice's secret key, no one can decrypt the message except for Alice. Thus, even if the message is intercepted or copied by a third party, its contents cannot be decrypted by that party.

A public-secret key pair can also be used to authenticate the source of a message. Suppose Bob wants to send Alice a message which Alice can verify as actually originating from Bob. The idea here is to prevent a third party from impersonating Bob using a message sent to Alice. To prevent this, Bob encrypts the message to Alice with Bob's secret key. Bob also indicates that the message originates from him using some unencrypted format (such as Bob's return address). When Alice receives the message, she sees that the message has Bob's return address and that the message is encrypted. Alice authenticates the claim that the message is from Bob by applying Bob's public key to the message. If Bob's public key successfully decrypts the message, then the message actually came from Bob since the decryption will only be successful if Bob's secret key was originally used to encrypt the message. If an imposter posing as Bob had created the message, the imposter would have had to use a different secret key and Alice would not be successful in decrypting this message with Bob's public key.

Augmented Printer Operation

The Augmented Printer adds certification information to the printed document in the form of a "signet." Physically, the signet is a machine-readable image printed on the paper document. The signet image encodes all information needed to authenticate the source and originality of the document. The Certification Subsystem generates the signet information as a block of encrypted digital data and combines it electronically with the digital document content to produce an "augmented" digital document. This augmented digital document is then printed on a blank sheet of paper by the conventional printing device. The signet may be printed as a visible image or as an invisible image. An invisible image can be printed using some form of transparent ink. Transparent ink would be used for purely aesthetic purposes and is in no way required for correct operation of the invention described here.

The printer user controls some of the information that is included in the signet. First, the user has the option to include a message with arbitrary user-defined content. For example, this message might include the time and date of document printing. Second, the user can choose to include the identity of the Certifier or the Augmented Printer, or both, in the signet. At least one of these identities will always be included in the signet by the user.

The signet always includes a digital code (signature) that uniquely identifies the sheet of paper on which the signet is printed. This allows an Authentication Subsystem to detect if a signet originally printed on a specific piece of paper has been transferred to another piece of paper. Such an illegitimate transfer could be accomplished by photocopying the original paper or by imaging a printed signet with a document scanner and reprinting it on another paper. The Certification Subsystem generates this paper signature without intervention of the printer user by imaging the grain structure of the paper on which the signet will be printed and deriving a digital code that uniquely identifies the structure of the paper grains.

Generating the signature does not require the entire paper to be imaged; only a region large enough to capture a distinguishing pattern of paper grains is required. This region is taken from a location on the paper that will not contain printed matter, such as the left or right page margin. This region is henceforth referred to as the "Signature ROI," where ROI is short for "region-of-interest."

The signet image is also printed on a region of the document that does not contain printed matter. The region of the paper containing the signet image is henceforth referred to as the "Signet ROI." The Signature ROI and Signet ROI are always at a fixed vector offset with respect to one another, and this relationship is known to both the Certification and Authentication Subsystems.

A public-key encryption protocol is used to encode the identities of the Certifier and/or Augmented Printer in the signet. This scheme assumes the existence of a public-key infrastructure in which the Certifier and Augmented Printer can each be assigned a public-key/secret-key pair by some trusted authority. Public databases associate the public keys of each entity (Certifier and Augmented Printer) with descriptive information for that entity. Descriptive information for a Certifier might include name, affiliation, and contact info. Descriptive information for an Augmented Printer might include printer serial number, location, manufacturer, type of device (fax machine, printer, copy machine), etc.

The Certification Subsystem encodes the identity of an entity (Certifier or Augmented Printer) into the signet by encrypting the paper signature and optional message with the secret key of that entity and appending the entity's public key to the encrypted block. The public key establishes the entity's identity since it can be used to access the database in which the entity is registered. (Alternatively, the entity's identity can be appended and its public key is then obtained from a database by the Authenticator.) The secret key encryption allows subsequent verification of the entity's identity since the included public key will not decrypt the block unless its was originally encrypted by the matching secret key. Assuming these secret keys are not compromised, this procedure prevents the identities of Certifying Agents and Augmented Printers from being spoofed in otherwise correctly-formatted signets. In general, two levels of secret-key encryption are applied in sequence to the message and paper signature: one level for the Certifying Agent and one level for the Augmented Printer. However, if a specific application only requires that the identity of either the Certifying Agent or the Augmented Printer (but not both) needs to be authenticated, then only one level of encryption is needed. For example, to safeguard the integrity of a ballot cast on a voting machine, only one level of encryption for the Augmented Printer (that is, the voting machine) is needed. The order in which these two levels of encryption are applied is arbitrary, provided that interoperating Certification and Authentication Subsystems always observe the same order.

The Certifier issuing the document may not wish to grant universal access to the information encoded in the signet. The secret-key encryptions applied on behalf of the Certifier and Augmented Printer do not restrict access to the signet data—they only allow the Certifier and Augmented Printer to be associated with the document and later authenticated. Restricting access to the signet data requires a final level of encryption. Therefore, the Certification Subsystem allows the augmented printer user to optionally specify a particular Authenticator—i.e., the person(s) or organization authorized to authenticate the document. This is done by encrypting the signet with the public (not the secret) key of this Authenticator. This encryption is performed after the two levels of secret key encryption used to encode the identities of the Certifier and Augmented Printer. An identifier specifying the Authenticator is appended to the outermost encrypted block, providing a pointer to the entity authorized to decrypt the signet. This identifier could either be the public key of the Authenticator or some other identifying code. As FIG. 1 shows, the Certification Subsystem could access a database of registered Authenticators to obtain the appropriate public key for this final level of encryption. A special reserved public key corresponding to "any Authenticator" can be used when the Certifier wishes to allow any Authenticator to authenticate the document. The use of this option in authenticating the document is described in greater detail in the next section.

Augmented Scanner Operation

A certified paper document is authenticated using an Augmented Scanner. The scanner operator uses the Augmented Scanner to image both the Signature ROI and Signet ROI. The Authenticating Subsystem in the Augmented Scanner recognizes the signet image in the Signet ROI, converts it to a digital stream of (encrypted) bits, and attempts to reverse the three levels of encryption previously applied to the signet data by the Certification Subsystem.

If the signet was encrypted for a specific Authenticator, the Authentication Subsystem will inform the scanner operator that the participation of that Authenticator is required. Document authentication will proceed only after the secret key of the specific Authenticator is used to decrypt the signet. If the signet indicates that "any Authenticator" is permitted, the Authentication Subsystem recognizes this and applies a universally known secret key corresponding to the reserved "any Authenticator" public key described earlier. Once the signet is decrypted with respect to the designated Authenticator, the remaining two levels of decryption are automatically performed by the Authentication Subsystem using the public keys of the Certifying Agent and Augmented Printer found in the signet.

The outputs of the Augmented Scanner are the identity of the Certifier (if given), the identity of the Augmented Printer (if given), any message that was included in the signet by the augmented printer user, and an indication of whether the document is an original or a copy.

The identities of the Certifier and/or Augmented Printer are obtained using the public keys extracted from the signet data to query public databases of registered Certifiers and Augmented Printers. These queries return descriptive information for each type of entity and this information is relayed to the Augmented Scanner operator.

If public-key decryption for either the Certifier or Augmented Printer fails, the Authentication Subsystem indicates that the identity of the entity was illegally associated with the document. That is, the included public key does not correspond to the secret key originally used to encrypt the data. The identity associated with the public key is therefore reported to the Augmented Scanner operator as invalid.

The Authentication Subsystem performs the check for document originality by extracting the paper signature of the document in question using the Signature ROI Image it obtained and comparing this signature to the signature included in the signet. These signatures will match bit-for-bit if the paper document under examination is the original paper for which the signet was originally created; if the signatures do not match, the document is reported as a copy.

Augmented Printer Packaging and Interfacing

Numerous options exist for implementing the Certification Subsystem and for packaging it with a conventional printing device to create an Augmented Printer. For example, the Certification Subsystem can be implemented as an embedded computer or as a software application running on a general-purpose host computer (PC, workstation, etc.). An embedded implementation of the Certification Subsystem is appropriate when it will be physically integrated into a conventional printing device to create a stand-alone Augmented Printer. However, an Augmented Printer can also be created by running a software implementation of the Certification Subsystem on a host computer connected to a conventional printing device. The Certification Subsystem and conventional printing device can therefore be either tightly or loosely integrated, whichever makes the most sense for the end application and targeted consumer market. The following two subsections explore these system packaging alternatives in more detail.

Tightly-Integrated Augmented Printer

FIG. 2 shows the internal top-level structure of a tightly-integrated "stand-alone" Augmented Printer. Also depicted are several scenarios for how a user might interact with it.

In this system, the Certification Subsystem is physically integrated with the conventional printing device and consists of a Certification Processing Module (CPM) and a Signature ROI Imager. The CPM is a small embedded computer which performs most of the processing functions of the Certification Subsystem. The Signature ROI Imager is a small image sensor and lens physically integrated into the paper feed system of the printing device. Both components are designed to be inexpensive and easily integrated into the printing device.

The CPM has five interfaces: (1) Operator Interface, (2) Signature ROI Image Input, (3) Digital Document Input, (4) Augmented Document Output, and (5) Database Interface.

The Operator Interface is a bidirectional communication channel the CPM uses to interact with the individual operating the Augmented Printer. This interface is flexible and can take any form appropriate for the end application. Several possible user interfacing styles are illustrated in scenarios A, B, and C in FIG. 2. However, an Augmented Printer implementation is certainly not limited to these scenarios.

In scenario A, the user interacts directly with the CPM through some form of "hand interface" (such as a keypad and LCD panel) built into the Augmented Printer. Such an interface would be appropriate when the conventional printing device is a fax or copy machine since these devices typically require the direct physical presence of the user.

In scenario B, the user interacts with the CPM through software running on a host computer which has a direct, private connection to the Augmented Printer. This configuration is appropriate when the conventional printing device is a digital document printer connected directly to a personal computer via a peripheral cable.

In scenario C, the Printing Agent also interacts with the CPM through software running on a host computer; in this case, however, communication with the Augmented Printer occurs over a network which might be shared with other host computers. This configuration illustrates a common situation in which the Augmented Printer is a network-capable digital document printer that can be accessed by multiple users, as in an office environment.

When accessed via a host computer (scenarios B and C), the Certification Subsystem would include driver software executing on the host computer for communicating with the Augmented Printer. The host-side Certification Subsystem software would also include a user interface to allow customization of the signet and to prompt for the Certifiers secret key (or a password which allows secure access of the secret key).

The user interfacing scenarios depicted in FIG. 2 are intended to illustrate the wide range of possibilities; other interfacing styles are clearly possible to implement the accustomed use model of a particular printing device. Implementing a new interfacing style merely involves adapting the CPM's Operator Interface to use the appropriate protocol and mechanism.

The Signature ROI Image Input interfaces the CPM to a sensor which captures a Signature ROI Image of the paper. This image sensor is considered part of the Certification Subsystem and is physically integrated into the paper feed system of the conventional printing device. The image sensor sends the Signature ROI Image to the CPM for use in generating the paper signature included in the signet.

The Digital Document Input is the communication channel for receiving the digital representation of the document to be printed so that the signet image can be electronically added to it. For augmented fax or copying machines, the Digital Document Input would come from the built-in document scanning hardware used in these devices. For digital document printers designed to communicate with host computers, the Digital Document Input would use the same physical communication medium as the Operator Interface: a peripheral cable or network linking the host computer with the Augmented Printer.

The Augmented Document Output is the communication channel for delivering the augmented digital document (digital document and signet image) to the conventional printing device for transfer to the paper.

Finally, the Database Interface implements a communication channel allowing the CPM to obtain the public key of an Authorized Authenticating Agent from a database of registered agents. This database could be either local or non-local to the document certification site.

The CPM can be built using any technology which permits implementation of the interfaces described above and performs the processing tasks necessary for document certification. This includes (but is not limited to) implementing the CPM as a printed circuit board with discrete components (such as microcontrollers, memories, etc.) or as a single Application-Specific Integrated Circuit (ASIC) incorporating all the required interfaces, memories, and processing functions. Note that the implementation choices for the CPM are in no way restricted to these specific examples.

Loosely-Integrated Augmented Printer

FIG. 3 depicts a loosely-integrated Augmented Printer combining a software-based Certification Subsystem with a conventional printing device. A host computer executes the Certification Subsystem as software and communicates with a conventional printing device over a peripheral cable or some form of network. The sensor for capturing the Signature ROI Image remains integrated in the paper feed system of the printing device. Some form of controller (depicted in FIG. 3 as "Host Interface Controller") must be integrated with the image sensor to relay the captured Signature ROI Image to the Certification Subsystem software so that it can generate the paper signature. After receiving the Signature ROI Image, the Certification Subsystem software can extract the signature, generate the signet, incorporate the signet into the digital document, and send the augmented digital document to the printing device in the same manner as a conventional "print job."

Augmented Scanner Packaging and Interfacing

Numerous options also exist for the implementation and system packaging of Augmented Scanners. Like the Certification Subsystem, the Authentication Subsystem can be implemented using a dedicated embedded computer or as software executing on a general-purpose host computer. FIGS. 4 and 5 illustrate some possible structures and interfacing styles.

Tightly-Integrated Augmented Scanner

In FIG. 4, the Augmented Scanner is a stand-alone, monolithic device. The Authentication Subsystem of this stand-alone device contains an integrated ROI Imager (for capturing the Signature and Signet ROI Images) and an Authentication Processing Module (APM). The APM is a small embedded computer which implements all functions of the Authentication Subsystem except ROI imaging. The APM is analogous to the CPM used in an Augmented Printer. The same implementation possibilities discussed for the CPM also apply to the APM.

The APM has three interfaces: (1) Operator Interface, (2) ROI Image Input, and (3) Database Interface. The Operator Interface is the communication channel by which the Authentication Subsystem interacts with the Augmented Scanner operator. The APM receives the ROI images from the scanning device over the ROI Image Input. The Database Interface allows access to databases of registered Certifiers and Augmented Printers. The APM Database Interface is identical in function to the Database Interface used by the CPM.

In scenario D of FIG. 4, an Augmented Scanner operator uses some form of "hand interface" to interact directly with the stand-alone Augmented Scanner. This interfacing style would be appropriate for a portable Augmented Scanner designed for hand-held or field use. In scenario E, an operator uses a host computer to interact with the stand-alone Augmented Scanner over a peripheral cable or network. This interfacing style would be appropriate for a stationary, desktop version of the Augmented Scanner.

Loosely-Integrated Augmented Scanner

The Authentication Subsystem of an Augmented Scanner can also be implemented as software running on a conventional host computer (such as a desktop PC), as shown in FIG. 5. In this case, the ROI image is captured using an external ROI Imager peripheral connected to the host computer. In this implementation, the external ROI Imager peripheral is not considered part of the Authentication Subsystem.

Combined Augmented Printer and Scanner

It should be noted that an Augmented Printer and Augmented Scanner can easily be combined into a dual-function system.

For example, the Certification and Authentication Subsystems can be implemented together as a single embedded processing module which is physically integrated into a combination print/scan device. This embedded module would combine the functionalities of the CPM and APM discussed earlier. The print/scan device's paper feed can be designed such that it selects either blank paper for printing or previously printed documents for ROI scanning. This would allow a single ROI Imager to be used for both document certification and authentication functions.

This dual-function approach can also be implemented in software in which the Certification and Authentication Subsystems execute as software applications on the same host computer. The host computer invokes each subsystem as needed in its interactions with various printer, scanner, and print/scan peripherals.

Finally, it should be noted that hybrids of the two preceding dual-function approaches are possible in which one subsystem (Certification or Authentication) executes as software on a computer host and the complementary subsystem (Authentication or Certification) is physically integrated with a print/scan device.

Certification and Authentication Subsystem Architecture

The following describes the block-level architectures of the Certification and Authentication Subsystems. "Architecture" is used here to mean a collection of process blocks which communicate using well-defined signal flows. The next two subsections define the process blocks used in each subsystem, the signals that flow between them, and a "black-box" specification of each process block's function. Subsequent subsections discuss the internal structure and implementation of each process block.

Certification Subsystem Architecture

FIG. 6 depicts the process block architecture of the Certification Subsystem.

The Signature ROI Imaging block is used to image a region of the blank paper with sufficient magnification and resolution to generate a clear image of the paper grains. The output of the Signature ROI Imaging block is a paper-grain image.

This paper-grain image is processed by a Signature Extraction block which outputs the paper signature along with coordinates specifying the Signature ROI within the paper. The paper signature is a digital code which uniquely identifies the paper that was imaged.

The signature is passed into a Signet Generation block along with some subset of the following items: user message, Certifier secret key, Augmented Printer secret key, and Authenticator public key. As FIG. 6 shows, the Authenticator public key might be retrieved from a database of registered Authenticators. Note that the secret key of the Augmented Printer must be stored internal to the Certification Subsystem in some secure fashion and is not externally accessible.

The Signet Generation block outputs the signet in the form of a machine-readable digital image. This signet image includes the encrypted certification information along with registration marks. These registration marks are used by the Authentication Subsystem for locating the signet within the ROI image it receives. These marks also permit the Authentication Subsystem to locate the Signature ROI since the Signature ROI always lies at a known distance and direction with respect to the printed signet.

The registration marks are also used by the Authentication Subsystem to transform the ROI image it obtains into a normalized scale and orientation. This eliminates the need for rigorous alignment procedures each time the document is imaged by either the Certification or Authentication Subsystem.

The signet image is integrated into the digital contents of the document using a Signet Integration block. The Signet Integration block outputs an augmented digital document stream which can be sent directly to the printing device for transfer to the paper. The Signet Integration block uses the Signature ROI coordinates output by the Signature Extraction block to encode the location within the document page at which to print the signet image. The signet is always placed at a known vector offset from the Signature ROI.

The outputs of the Certification Subsystem are the blank paper for which the signature was extracted and the augmented digital document stream containing the signet image. These are combined using a conventional printing device to generate the certified paper document.

Authentication Subsystem Architecture

FIG. 7 depicts the process block architecture of the Authentication Subsystem.

The first step in document authentication is to obtain an ROI image from the paper document. It is not necessary to image the entire document: just the ROI containing both the signet image and the region for signature extraction.

As described earlier, an Authentication Subsystem can include an integrated ROI Imager (FIG. 4) or accept an ROI image captured using an external scanner (FIG. 5). FIG. 7 depicts both possibilities.

The ROI image is passed to an ROI Segmentation block. This block extracts two smaller images from the ROI image: a Signature ROI Image and a Signet ROI Image. The Signature ROI Image contains the region over which signature extraction is performed. The Signet ROI Image contains the signet image. The ROI Segmentation block first searches for the registration marks included in the signet image. The registration marks define the boundaries of the Signet ROI. Knowing the Signet ROI boundaries, the ROI Segmentation block can locate the Signature ROI since the signature extraction region and the Signet ROI are always in a known spatial relationship. The registration marks are also used to rotate and scale the input ROI Image as necessary to place it in the standard orientation and scale expected by subsequent image processing blocks. This corrects for alignment errors during document imaging.

The Signature Extraction block extracts a paper signature from the Signature ROI Image it receives from the ROI Segmentation block. The core signature extraction process used in this block is identical to that used in the Signature Extraction block of the Certification Subsystem. The paper signature is output using the same digital code as before.

The Signet Extraction block examines the Signet ROI Image it receives from the ROI Segmentation block, recognizes the signet image, and extracts the encrypted information encoded in the signet image, outputting it as a sequence of binary bits. These encrypted signet bits are passed to the Signet Decryption block.

The Signet Decryption block attempts to reverse each level of encryption originally applied to the user message and paper signature by the Certification Subsystem. The outputs of the Signet Decryption block are the user message, the identities of the Certifier and Augmented Printer, and the paper signature included in the signet by the Certification Subsystem.

If a specific Authenticator is indicated in the signet, that Authenticator's secret key is required by the Signet Decryption block to complete its function. Once the Authenticator's secret key is supplied, it is used to decrypt the outermost layer of encryption. Next, two nested decryptions are attempted using the public keys of the Certifier and Augmented Printer included in the signet. If decryption using the included public key of an entity (either Certifier or Augmented Printer) fails, then the public key does not correspond to the secret key originally used to encrypt the message and the indicated owner of the public key is reported as non-authentic. If a public key successfully decrypts the data, it is reported as originating from its true owner (Certifier and/or Augmented Printer). This public key may then be used to access a database of registered Certifiers or Augmented Printers to obtain further information about the key owner's identity. This identity information is reported to the Augmented Scanner operator.

The Signature Verification block performs a final document authentication check. It compares the paper signature extracted from the decrypted signet with the paper signature extracted by the Signature Extraction block of the Authenticating Subsystem. The comparison is a bit-wise check for equality. If the two signatures are equivalent at the bit level, the Authentication Subsystem reports the document as an original; otherwise, it reports the document as a copy.

Certification Subsystem Process Blocks

Signature ROI Imaging

The Signature ROI Imaging block for the Certification Subsystem contains hardware for obtaining a clear image of the grain structure of the paper. The image obtained is referred to as the Signature ROI Image. FIG. 8 shows one possible system for imaging the paper grains. The paper is positioned by the paper feed system between a light-emitting diode (LED) and a camera consisting of a lens and image sensor. A back-lit image of the paper grains is created by shining light from the LED through the paper and focusing it onto the camera image sensor using the lens. The sensor captures the paper-grain image and outputs it as a stream of digitally-encoded grey-level pixel values. The paper is positioned relative to the camera to obtain the Signature ROI Image from a region of the paper that will not contain printed matter (such as a page margin).

This is not the only way to implement the Signature ROI Imaging block. Any other inexpensive imaging system capable of capturing a clear paper-grain image can also be used.

Signature Extraction

FIG. 9 shows the top-level sequence of processing steps taken inside the Signature Extraction block. Recall that the Certification and Authentication Subsystems each use a version of this block. Both versions take a Signature ROI Image as input and output the paper signature as a digital code. The version used in the Certification Subsystem additionally outputs the coordinates defining the location of the Signature ROI within the paper. In both versions, the processing steps applied to the ROI image are identical and are collectively referred to as the "Core Signature Extraction Process".

Different methods of implementing the Core Signature Extraction Process exist and will have different degree of robustness, which will affect the accuracy of the system. For example, cross correlation has been used in the prior art for this purpose. A new and robust process is summarized in FIG. 9 and presented in more detail in FIG. 10 as part of this invention.

In Step 1 of this process (FIG. 9), the paper grains in the image are recognized and located using image processing operations. This involves filtering the image to suppress noise, normalizing image intensity for variations in illumination and sensor response, and computing the best fit of a mathematical paper grain model at all points in the image.

In Step 2, the most "significant" grains are selected for use in the paper signature. These are the grains that are most easily distinguished and which are the least susceptible to noise variations expected over multiple signature extraction trials. The paper grain model applied in Step 1 allows the "volume" enclosed by each grain's image intensity surface to be quantified. Regions of the image for which the model fit is good and which have a grain "volume" above a set threshold are classified as "significant" paper grains.

In Step 3, each "significant" grain is encoded using a robust descriptor that can be reliably reproduced over repeated trials in the presence of noise. This descriptor includes information about the grain's volume and two-dimensional location in the ROI image.

In Step 4, up to N "most significant" grains are selected for inclusion in the signature. These are the grains whose descriptors are the least likely to be influenced by noise. A digital code is generated from this final selection of grain descriptors, resulting in the paper signature.

FIG. 10 provides the details of this Core Signature Extraction Process.

First, the ROI image is convolved with a smoothing kernel, such as a 2D Gaussian filter.

Next, the image is normalized such that its pixel intensity values have zero mean and unit variance. These two steps suppress noise and reduce the impact of expected variations in illumination and sensor sensitivity between signature extraction trials.

Then, the best fit of the paper grain model is computed for each point (x,y) in the image within a m×m square region of pixels (the "kernel" region) around the point. The image intensity function of a paper grain is modeled using a paraboloid surface. A least squares fit of this paraboloid surface is performed over the m×m kernel region. The mean-squared-error (MSE) of each paraboloid fit is computed. Also, the "volume" v of the best-fit paraboloid is computed with respect to a constant-height plane whose height is equal to the mean image intensity. This volume is zero if the vertex of a concave-up paraboloid is greater than the mean intensity or if the vertex of a concave-down paraboloid is less than the mean intensity. Otherwise, the volume is positive for a concave down paraboloid fit and negative for a concave up paraboloid fit.

At each point, a measure of the paraboloid model fit is calculated as $f=1/(1+MSE)$ for points that coincide with the vertex of a paraboloid. If a point does not coincide with a vertex, then its measure of fit is set to zero ($f=0$).

At each point, the measure of paraboloid fit is multiplied by the volume of the paraboloid to yield a new parameter, $\lambda$, whose absolute value is interpreted as a "significance" factor for the candidate "grain." All grain candidates with $|\lambda|$ below a set threshold are discarded. The surviving candidates are viewed as significant paper grains and the volume and two-dimensional ROI image coordinates of each grain is saved as the ordered triple (v,x,y) "Significant" grains are therefore regions whose image intensity surfaces resemble a paraboloid and enclose a significant volume with respect to the mean image intensity.

Some variation in the low-order bits of v, x, and y due to noise and alignment errors is expected across signature extraction trials. To eliminate this variation from the extracted signature, some predetermined number of low-order bits in each of v, x, and y are discarded and the resulting high-order encoded values are concatenated to create a robust grain descriptor represented by the ordered triple (v', x', y').

These robust grain descriptors are next sorted to rank them by their ability to uniquely specify the paper. The sorting key for each descriptor (v', x', y') is a binary number that is the concatenation of the values |v'|, x', and y' with as the most significant bit field. This ranks the grains with the largest volume magnitude as the most significant. The absolute value of v' is used since v' may be either positive or negative. The absolute value of v' is taken only to produce the sorting key for each descriptor—each sorted descriptor is still represented as the ordered triple (v', x', y') , thus retaining the sign information in v'.

The N most significant descriptors in the sorted list are used to generate the final signature code. These N descriptors are concatenated to form a vector S of bits. This vector S may be quite large depending on the value of N required in practice for robust system operation. To reduce the number of bits in the signature, a hash function is applied to the vector S of descriptors to map this vector to a shorter code word of the desired length.

The signature extraction process described above uses a number of parameters whose values must be determined empirically to guarantee robust system operation across the expected range of paper grain characteristics and operating conditions. The parameters which must be empirically determined are: (1) the value m used for the m×m kernel region in the paraboloid fit step, (2) the threshold which is applied to the significance factor $\lambda$, (3) the number of low-order bits of v, x, and y which are discarded to form a robust grain descriptor, (4) the number N of grain descriptors selected from the top of the sorted list, (5) the hash function used to reduce the code word size, and (6) the size of the Signature ROI Image.

Signet Generation

FIG. 11 depicts the internal details of the Signet Generation block of the Certification Subsystem. The signature computed by the Signature Extraction block is first concatenated with an optional user-defined message to form message m1. m1 is encrypted with the secret key of the Augmented Printer to produce message m2. The public key of the Augmented Printer is concatenated with m2 to produce m3. m3 is encrypted with the secret key of the Certifier to produce message m4. The public key of the Certifier is concatenated with m4 to produced message m5. m5 is encrypted with the public key of the Authenticator to produce message m6. m6 is concatenated with the Authenticator's identifier (possibly that Authenticator's public key) to form message m7.

These three encryption steps associate the signet data with the identities of three entities: Certifier, Augmented Printer, and Authenticator. If any of these entities does not need to be specified, a well-defined default exists for each entity which is understood by both the Certification and Authentication Subsystems. The defaults for the Certifier and Augmented Printer are implemented using public keys whose corresponding secret keys are in fact publicly available and can therefore be used by any Augmented Printer operator when creating a certified document. These default key pairs correspond to an "Unspecified Certifier" and "Unspecified Augmented Printer."

A default descriptor for the Authenticator is used when restricting signet access to a specific Authenticator is not required. This default is implemented using a public key and corresponding secret key which are both publicly available and can be used by any printer/scanner operator when certifying/authenticating a document. This default key pair corresponds to "Any Authenticator." The outermost layer of encryption is performed using this default if no specific Authenticator is indicated to the Certification Subsystem.

It should be noted that the order of the first two encryption steps is not important for an implementation of the Signet Generation block, provided that a specific order is consistently used by both the Certification and Authentication Subsystems. Order is not important because the first two encryptions are used to bind the signet data to a specific Certifier and Augmented Printer in a way that can be subsequently verified. These encryptions provide no means of restricting access to the signet data (i.e., user message and paper signature) since the public keys for undoing each encryption are provided with the encrypted block. In contrast, the encryption with respect to the Authenticator must be performed last since it does serve the purpose of restricting access to the signet data.

The secret key of the Augmented Printer is stored internal to the Certification Subsystem. It is not externally accessible outside of the Certification Subsystem. For a tightly-integrated Augmented Printer implementation (FIG. 2) using an embedded Certification Processing Module (CPM), the secret key can be assigned to the Augmented Printer in the factory and stored in encrypted form in the CPM's firmware. The process within the CPM which executes the Signet Generation block would read the key in encrypted form from firmware and decrypt it at run time. For software-based implementations of the Certification Subsystem (FIG. 3), the Augmented Printer secret key could reside in encrypted form on the host computer running the Certification Subsystem software. The software would decrypt the key prior to using it for Signet Generation.

The final step in Signet Generation is to encode the triply-encrypted signet data as a machine readable image and to add registration marks to this signet image. The signet image format used is not critical. Existing barcode standards could be used or an entirely new scheme could be developed. The only requirement is that the format allows the encrypted signet data to be reliably read by the Authentication Subsystem.

The exact format used for the registration marks is also not critical. Any markings which can be reliably used by the ROI Segmentation block in the Authentication Subsystem to properly locate, orient, and scale the signet image, and to identify the region for signature extraction will suffice.

Signet Integration

The Signet Integration block merges the digital representation of the signet image with the digital representation of the document to be printed to produce the final augmented digital document that is printed on the paper. The Signature ROI coordinates output by the Signature Extraction block are used to correctly position the signet image within the document page so that it is in the proper location with respect to the signature extraction region.

The implementation of the Signet Integration block is highly dependent on the specific printing device being used as an Augmented Printer. The Signet Integration block needs to understand the digital representation used by the printing hardware to render the document on the paper. This representation will vary between printing devices, requiring the Signet Integration block to be customized for different printing devices. This customization can be efficiently handled in software (for software-based Certification Subsystems) or CPM firmware (for embedded Certification Subsystems).

If the signet is to be printed as an invisible image using a special transparent printer ink, the Signet Integration block must insert the necessary printer control codes in the augmented digital document stream to select the transparent ink when printing the signet image. As noted above, the use of a transparent ink is a purely aesthetic choice and is optional in an implementation of the Certification Subsystem.

Authentication Subsystem Process Blocks

ROI Imaging

The hardware used in this step is essentially the same hardware used in the ROI Imaging block of the Certification Subsystem (FIG. 8). The main difference is in the size of the document region that must be imaged. The ROI Imaging block in the Certification Subsystems only needs to image the signature extraction region (Signature ROI). The ROI Imaging block in the Authentication Subsystem needs to image both the Signature ROI and the region containing the signet image (Signet ROI).

ROI Segmentation

The ROI Segmentation block receives an ROI Image containing both the signet image and the region for signature extraction. The ROI Segmentation block first locates the registration marks in the signet image. This can be done using any number of well-known pattern recognition techniques for images. The deviation of the observed registration marks from an expected orientation and scale can also be computed and the ROI image can be rotated and resealed to place it into a standard representation. Again, numerous well-known techniques are available for implementing these operations.

Once the image orientation and scale have been normalized, the ROI Segmentation block extracts two sub-images for further processing: a Signet ROI Image containing the signet image and a Signature ROI Image containing the region for signature extraction. The registration marks are used to establish the boundaries for the Signet ROI. The Signature ROI has a known size and is at a known distance and direction from the Signet ROI, and is therefore easily located and extracted as well.

Signature Extraction

The core signature extraction process used in this block is the same process described earlier for the Signature Extraction block of the Certification Subsystem.

Signet Extraction

The Signet Extraction block extracts the encrypted information encoded in the signet image. The operation of the block is therefore dependent on the format of the signet image. As noted previously, the exact format used is not critical. If a simple barcode is used, this block can be implemented using existing barcode reading techniques. If other formats for encoding information in images are more suitable, they can likewise be adapted for use in this block and in generating the signet image.

Signet Decryption

FIG. 12 shows the internal operation of the Signet Decryption block. This block inverts the three-level encryption applied to the signet data by the Certification Subsystem's Signet Generation block. The input is the encrypted signet data and the Authenticator's secret key (if required). The outputs are any message included in the signet, the paper signature, and the identities of the Certifier and Augmented Printer which generated the certified document.

The encrypted signet data enters the Signet Decryption block in FIG. 12 as message m7. m7 is composed of two parts: an encrypted block of data (m6) and an identifier specifying the Authenticator. This identifier is compared against the default "Any Authenicator" identifier. (Note that these identifiers could be public keys). If the Authenticator is the default ("Any Authenticator"), the publicly-known "secret" key corresponding to this default Authenticator is used to decrypt message m6. Otherwise, the Authenticating Subsystem prompts for the secret key of the non-default Authenticator specified in m7.

After obtaining the secret key of the Authenticator, the Signet Decryption block uses it to decrypt message m6, resulting in message m5. m5 should contain the public key of the Certifier and a block of encrypted data, m4. The Certifier's public key is used to decrypt m4. If the decryption is not successful, the Certifier's identity is reported as "Invalid." If the decryption is successful, then the public key in m5 is compared against the known public key which denotes the default "Unspecified Certifier". A match causes the Certifier's identity to be reported as "Unspecified." If a non-default public key is used, the Signet Decryption block uses it to query a database of registered Certifiers for information about the Certifier's identity and any information returned by the query is relayed to the Augmented Scanner operator.

Assuming that m4 is successfully decrypted, the resulting message m3 contains the public key of the Augmented Printer and a block of encrypted data, m2. This public key is applied to m2 in the same way that the Certifier's public key was applied to message m4 in the preceding discussion. This procedure results in the identity of the Augmented Printer being reported as either "Invalid" (decryption of m2 not successful), "Unspecified" (default public key was used), or as "Specified" with additional information obtainable from a public database of Augmented Printers using the Augmented Printer's public key.

Assuming m2 is successfully decrypted, the output m1 contains the paper signature extracted when the signet was generated and any user message included in the signet. If present, the user message is displayed to the Augmented Scanner operator. The paper signature contained in m1 is passed to the Signature Verification block for comparison with the signature extracted by the Authentication Subsystem's Signature Extraction block.

Signature Verification

This blocks receives two paper signatures: one from the Signet Decryption block and one from the Signature Extraction block. A bit-wise check for equivalence is performed. If the two signatures are equivalent, the document is reported as the original paper for which the signet was generated. Otherwise, the document is reported as a copy.

Voting Machine Application

The Document Certification and Authentication System discussed above can be used in many applications where document security is of importance. One such application is to safeguard the integrity of a ballot cast on a voting machine. The goal here is to ascertain, for a ballot in question, the voting machine on which the ballot is cast. To achieve this goal, a voting machine can be regarded as an Augmented Printer. Since there is no need to specify or identify either a Certifier or Authenticator, only one level of encryption is needed, which is the encryption of the characteristic paper grain signature for a ballot using the voting machine's secret key. In this way, whether or not a ballot is the original one cast and printed on a valid voting machine can be verified.

We claim:

1. A method for using the grain structure of a paper and user-specified information to safeguard the integrity of machine-printed paper documents, comprising:
    imaging said paper producing an image of the paper to extract a paper grain image;
    determining a characteristic signature for said paper from said paper grain image by performing the steps of:
        filtering the image of the paper to suppress noise to generate a filtered image,
        normalizing pixel intensities of said filtered image for variations in illumination and sensor response,
        computing for every point (x, y) in the image a least-squares fit of a paraboloid surface over a region of pixels around said point (x, y) and calculating the mean-squared error,
        calculating the volume v enclosed by each paraboloid surface intersecting a mean-intensity plane,
        calculating a significance factor $\lambda$ which is a function of said volume v and of the mean-square error in said region of pixels about every point (x, y),
        discarding all points having $|\lambda|$ less than a threshold,
        forming a paper grain descriptor (v, x, y) for all surviving points,
        concatenating said paper grain descriptors into a single vector S, and
        hashing said single vector S to a code word by applying one or more hash functions to S;
    entangling said characteristic signature with user-specified information using a predetermined sequence of private and public key encryption steps into a machine readable image to form a signet;
    printing said signet on said paper;
    locating and extracting said signet within said paper;
    decrypting and disentangling said user-specified information and said characteristic signature of said paper for which said extracted signet was originally created;
    imaging said paper for authentication;
    determining a characteristic signature for said paper;
    comparing said characteristic signature for said paper with said disentangled characteristic signature from said signet; and
    determining the originality of said paper.

2. The method as recited in claim 1, wherein entangling said characteristic signature with said user-specific information using a predetermined sequence of private and public key encryption steps into a machine readable image to form a signet comprises:
    concatenating said characteristic signature of said paper with said user-specified information to generate a message;
    encrypting said message using an augmented printer's secret key;
    concatenating said message with said augmented printer's public key;
    encrypting said message using a certifier's secret key;
    concatenating said message with said certifier's public key;
    encrypting said message using an authenticator's public key;

concatenating said message with said authenticator's identifier; and converting said message into said machine readable image.

3. The method as recited in claim 1, wherein decrypting and disentangling said user-specified information and said characteristic signature of said paper for which said extracted signet was originally created from said extracted signet comprises:
converting said machine readable image into a message;
separating said authenticator's identifier from said message;
obtaining said authenticator's secret key;
decrypting said message using said authenticator's secret key;
separating said certifier's public key from said message;
decrypting said message using said certifier's public key;
separating said augmented printer's public key from said message;
decrypting said message using said augmented printer's public key; and
separating said characteristic signature of said paper from said user-specified information.

4. The method as recited in claim 1, wherein imaging said paper is achieved by backlighting.

5. The method as recited in claim 1, wherein determining a characteristic signature for said paper further comprises:
calculating measure of paraboloid fit f as the multiplicative inverse of one plus mean-square-error if (x,y) coincide with the vertex of paraboloid and as zero otherwise; and
multiplying said volume v and said fit measure f to generate significance factor λ.

6. The method as recited in claim 1, wherein determining a characteristic signature for said paper further comprises discarding low order bits in (v, x, y) to generate descriptors (v', x', y').

7. The method as recited in claim 1, further comprising the steps of:
sorting said descriptors (v, x, y) by using the concatenation {|v|,x,y} as the sorting key;
selecting top N descriptors in the sorted list;
concatenating top N descriptors into a single vector S'; and
hashing said single vector S' to a code word by applying one or more hash functions to S'.

8. The method as recited in claim 1 wherein the steps of:
imaging said paper producing an image of the paper to extract a paper grain image;
determining a characteristic signature for said paper from said paper grain image;
entangling said characteristic signature with user-specified information using a predetermined sequence of private and public key encryption steps into a machine readable image to form a signet; and
printing said signet on said paper;
are performed by at least one of a voting machine apparatus and an augmented printer.

9. The method as recited in claim 1, wherein the steps of:
locating and extracting said signet within said paper;
decrypting and disentangling said user-specified information and said characteristic signature of said paper;
imaging said paper for authentication;
determining a characteristic signature for said paper;
comparing said characteristic signature for said paper with said disentangled characteristic signature from said signet; and
determining the originality of said paper;
are performed by an augmented scanner.

10. The method as recited in claim 1, wherein the step of filtering the image of the paper to suppress noise to generate a filtered image comprises convolving the image of the paper with a smoothing kernel.

11. The method as recited in claim 1 wherein the step of normalizing pixel intensities of said filtered image for variations in illumination and sensor response comprises normalizing pixel intensities of said filtered image to have zero mean and unit variance.

12. A method of determining a characteristic signature for a paper comprising the steps of:
imaging said paper producing an image of the paper to extract a paper grain image;
filtering the image of the paper to suppress noise to generate a filtered image;
normalizing the pixel intensities of said filtered image for variations in illumination and sensor response;
computing for every point (x, y) in the image a least-squares fit of a paraboloid surface over a region of pixels around said point (x,y) and calculating the mean-squared error;
calculating the volume v enclosed by each paraboloid surface intersecting a mean-intensity plane;
calculating a significance factor λ which is a function of said volume v and of the mean-square error in said region of pixels about every point (x, y);
discarding all points having |λ| less than a threshold;
forming a paper grain descriptor (v, x, y) for all surviving points;
concatenating said paper grain descriptors into a single vector S; and
hashing said single vector S to a code word by applying one or more hash functions to S.

13. The method as recited in claim 12, wherein determining a characteristic signature for said paper further comprises:
computing a measure of fit f for said paraboloid surface as the multiplicative inverse of one plus said mean-squared error, if the point (x, y) coincides with the vertex of the paraboloid and as zero otherwise; and
calculating said significance factor λ by multiplying said volume v by said fit measure f.

14. The method as recited in claim 12, wherein determining a characteristic signature for said paper further comprises discarding low order bits in (v, x, y) to generate descriptors (v', x', y').

15. The method as recited in claim 12, wherein determining a characteristic signature for said paper further comprises:
sorting said descriptors (v, x, y) by using the concatenation {|v|, x, y} as the sorting key;
selecting the top N descriptors in the sorted list;
concatenating the top N descriptors into a single vector S'; and
hashing said single vector S' to a code word by applying one or more hash functions to S'.

16. The method as recited in claim 12, wherein the step of filtering the image of the paper to suppress noise to generate a filtered image comprises convolving the image of the paper with a smoothing kernel.

17. The method as recited in claim 12 wherein the step of normalizing pixel intensities of said filtered image for variations in illumination and sensor response comprises normalizing pixel intensities of said filtered image to have zero mean and unit variance.

18. A document certification and authentication system comprising:
an augmented printer configured to:
produce an image of a machine-printed paper document,
extract a paper grain image,
determine a characteristic signature for said paper grain image by performing the steps of:
filter the image of the paper to suppress noise to generate a filtered image,
normalize the pixel intensities of said filtered image for variations in illumination and sensor response,
compute at every point (x, y) in the image a least-square fit of a paraboloid surface over a region of pixels around said point (x, y) and calculate the mean-square-error,
calculate volume v enclosed by each paraboloid surface intersecting a mean-intensity plane,
calculate a significance factor $\lambda$ which is a function of said volume v and of the mean-square error in said region of pixels about every point (x, y),
discard all points having $|\lambda|$ less than a threshold,
form a paper grain descriptor (v, x, y) for all surviving points,
concatenate said paper grain descriptors into a single vector S, and
hash said vector S to a code word by applying one or more hash functions to vector S;
entangle said characteristic signature with user-specified information using a predetermined sequence of private and public key encryption steps into a machine readable image to form a signet, and
print said signet on said paper; and
an augmented scanner configured to:
locate and extract said signet within said paper,
decrypt and disentangle said user-specified information and said characteristic signature of said paper,
image said paper for authentication,
determine a characteristic signature for said paper,
compare said characteristic signature for said paper with disentangled characteristic signature from said signet, and
determine the originality of said paper.

19. The system as recited in claim 18, wherein entangling said characteristic signature with said user-specific information using a predetermined sequence of private and public key encryption steps into a machine readable image to form a signet comprises:
concatenating said characteristic signature of said paper with said user-specified information to generate a message;
encrypting said message using an augmented printer's secret key;
concatenating said message with said augmented printer's public key;
encrypting said message using a certifier's secret key;
concatenating said message with said certifier's public key;
encrypting said message using an authenticator's public key;
concatenating said message with said authenticator's identifier; and
converting said message into said machine readable image.

20. The system as recited in claim 18, wherein decrypting and disentangling said user-specified information and said characteristic signature of said paper for which said extracted signet was originally created from said extracted signet comprises:
converting said machine readable image into a message;
separating said authenticator's identifier from said message;
obtaining said authenticator's secret key;
decrypting said message using said authenticator's secret key;
separating said certifier's public key from said message;
decrypting said message using said certifier's public key;
separating said augmented printer's public key from said message;
decrypting said message using said augmented printer's public key; and
separating said characteristic signature of said paper from said user-specified information.

21. The system as recited in claim 18, wherein determining a characteristic signature for said paper further comprises:
calculating measure of paraboloid fit f as the multiplicative inverse of one plus mean-square-error if (x, y) coincide with the vertex of paraboloid and as zero otherwise; and
multiplying said volume v and said fit measure f to generate significance factor $\lambda$.

22. The system as recited in claim 18, wherein determining a characteristic signature for said paper further comprises discarding low order bits in (v, x, y) to generate descriptors (v', x', y').

23. The system as recited in claim 18, further comprising the steps of:
sorting said descriptors (v, x, y) by using the concatenation $\{|v|, x, y\}$ as the sorting key;
selecting top N descriptors in the sorted list;
concatenating top N descriptors into a single vector S'; and
hashing said single vector S' to a code word by applying one or more hash functions to S'.

24. The system as recited in claim 18, wherein the step of filtering the image of the paper to suppress noise to generate a filtered image comprises convolving the image of the paper with a smoothing kernel.

25. The system as recited in claim 18 wherein the step of normalizing pixel intensities of said filtered image for variations in illumination and sensor response comprises normalizing pixel intensities of said filtered image to have zero mean and unit variance.

26. The system as recited in claim 18, wherein imaging said paper is achieved by backlighting.

27. The system as recited in claim 18 wherein:
the steps of:
imaging said paper producing an image of the paper to extract a paper grain image,
determining a characteristic signature for said paper grain image,
entangling said characteristic signature with user-specified information using a predetermined sequence of private and public key encryption steps into a machine readable image to form a signet, and
printing said signet on said paper,
are performed by a voting machine apparatus.

* * * * *